(12) United States Patent
Yamashita

(10) Patent No.: US 7,075,802 B2
(45) Date of Patent: Jul. 11, 2006

(54) SEMICONDUCTOR DEVICE FOR CONTROLLING SWITCHING POWER SUPPLY

(75) Inventor: Tetsuji Yamashita, Kyoto (JP)

(73) Assignee: Matsushita Electric Industrial Co., Inc., Osaka (JP)

( * ) Notice: Subject to any disclaimer, the term of this patent is extended or adjusted under 35 U.S.C. 154(b) by 0 days.

(21) Appl. No.: 11/089,332

(22) Filed: Mar. 25, 2005

(65) Prior Publication Data

US 2005/0219776 A1    Oct. 6, 2005

(30) Foreign Application Priority Data

Mar. 31, 2004    (JP)    ............................. 2004-101623

(51) Int. Cl.
  *H02M 3/335*    (2006.01)
  *H02M 7/44*    (2006.01)
(52) U.S. Cl. .............................. 363/21.12; 363/21.16; 363/21.15
(58) Field of Classification Search ............. 363/21.12, 363/21.15, 21.16, 21.18, 56.01, 97; 323/902
See application file for complete search history.

(56) References Cited

U.S. PATENT DOCUMENTS

| 4,626,976 | A | * | 12/1986 | Abe et al. ...................... 363/19 |
| 6,134,123 | A | * | 10/2000 | Yamada ................... 363/21.13 |
| 6,320,763 | B1 | * | 11/2001 | Hosotani ...................... 363/16 |
| 6,469,913 | B1 | * | 10/2002 | Hosotani et al. .............. 363/16 |
| 6,960,906 | B1 | * | 11/2005 | Yamashita .................. 323/285 |

FOREIGN PATENT DOCUMENTS

JP    2002315333 A    10/2002

* cited by examiner

*Primary Examiner*—Bao Q. Vu
(74) *Attorney, Agent, or Firm*—Steptoe & Johnson LLP

(57) ABSTRACT

A semiconductor device (51) for controlling a switching power supply, includes a switching element (1) and a switching control circuit. During an intermittent switching operation of the switching element (1), when a return signal is outputted from a light load detection circuit (32) before the counting of a counter circuit (14), the switching operation of the switching element (1) is restarted at the timing of a transformer reset signal from a transformer reset detection circuit (13) after the return signal is outputted. When the return signal is outputted from the light load detection circuit (32) after the counting of the counter circuit (14), the switching operation of the switching element (1) is restarted, regardless of the transformer reset signal, only when the return signal is outputted.

11 Claims, 16 Drawing Sheets

SEMICONDUCTOR DEVICE FOR CONTROLLING SWITCHING POWER SUPPLY

BACKGROUND OF THE INVENTION

1. Field of the Invention

The present invention relates to a semiconductor device for controlling a switching power supply whereby the output voltage of the switching power supply is controlled by a switching operation.

2. Description of the Related Art

Conventionally, switching power supply units using semiconductor devices for controlling switching power supplies are widely used as the power supplies of home appliances such as home electrical products to improve power efficiency with low power consumption. In the semiconductor device, an output voltage is controlled (stabilized) by using the switching operation of a semiconductor (a switching element such as a transistor).

Particularly in recent years, in view of the prevention of global warming, attention has focused on a reduction of power consumption in a standby state of appliances such as home electrical products and thus switching power supply units achieving lower power consumption during standby are in great demand.

In order to meet the demand, a power supply system or the like is developed for properly using two switching power supply units according to an operation mode of an appliance. For example, a switching power supply unit for a main power supply is provided to supply power at rated load in a normal operation (normal mode) of the appliance, and a switching power supply unit only for a standby state is separately provided to supply power during standby in a standby operation (standby mode) of the appliance. When the appliance is in a standby state, power is supplied from the switching power supply only for a standby state. At rated load, power is supplied from the switching power supply for the main power supply.

However, this power supply system requires two switching power supply units (converters), increasing the cost of the overall circuit including the semiconductor devices for controlling the switching power supplies. Therefore, when lower cost is strongly demanded, a power supply system constituted of a single switching power supply unit (converter) has been used in many cases. In this case, switching power supply units of partial resonance have been frequently used in view of the efficiency of a power supply and noise.

In such a semiconductor device for controlling a switching power supply, a current applied to a switching element is reduced at a light load, e.g., during standby. However, it is always necessary to supply, via a transformer, the internal circuit current of the semiconductor device for controlling the switching power supply. Therefore, it is not possible to reduce a current flowing to the switching power supply to 0 as well as a current flowing to the switching element and thus a certain amount of current is applied even at no load. Hence, the switching operation of the switching element causes a loss even at no load and a lighter load causes a larger loss in the switching element. Consequently, the switching power supply decreases in power efficiency and thus it is not possible to meet the need for lower power consumption in a standby state of the power supply.

Further, the switching power supply of partial resonance has the following problem: since the switching power supply has a high oscillation frequency at light load, a switching loss increases and the efficiency of the power supply decreases in a standby mode.

(Prior Art 1)

As a solution for the low efficiency of a power supply in the standby mode (e.g., Japanese Patent Laid-Open No. 2002-315333), the following controlling technique is used: the state of a load on the secondary side of the power supply is detected by a microcomputer, a transition is made to a standby mode in response to the signal, and intermittent oscillation is performed by feedback control according to a commercial frequency. In this case, in order to improve the efficiency of a power supply in a stand by mode, feedback control is performed by the microcomputer as follows: when an output voltage increases to a predetermined value or higher at light load, the switching operation of a switching element is stopped, and then when the output voltage decreases to the predetermined value or lower, the switching operation of the switching element is restarted.

In this switching power supply, an oscillation frequency in the intermittence of the switching operation is constant regardless of a load. Thus, improvement in the efficiency of the power supply during standby is still insufficient.

(Prior Art 2)

For this problem, a switching power supply unit is devised. Referring to FIG. 16, the switching power supply unit will be schematically discussed below.

FIG. 16 is a circuit diagram showing a structural example of the conventional switching power supply unit. As shown in FIG. 16, in the switching power supply unit, a switching power supply applies a direct-current input voltage VIN to a switching element 1 via a primary winding 103a of a transformer 103, controls a direct-current output voltage Vo by the switching operation of the switching element 1, and supplies power to a load 109. The output voltage Vo is obtained by rectifying and smoothing an alternating current, which has been generated on a secondary winding 103b of the transformer 103, by a rectifier 104 and a capacitor 105. The switching power supply comprises: a transformer reset detection circuit 13 which detects the reset state of the transformer 103 according to an alternating voltage generated on a tertiary winding 103c of the transformer 103 and outputs a transformer reset detection signal indicating the reset state, the reset state being caused by the switching operation of the switching element 1; an I-V converter 29 for converting a change in control current, which is obtained through an output voltage detection circuit 106 and a phototransistor 110 according to a change in the direct-current voltage Vo generated on the secondary winding 103b of the transformer 103, into a voltage corresponding to the value of current; and a light load detection circuit 32 for outputting a control signal for controlling the intermittent operation of switching performed by the switching element 1 when a light load is detected according to a change in output voltage VEAO from the I-V converter 29 as a load state indicating power supplied to a load 109. These circuits and converter constitute a part of a control circuit for driving the control electrode (gate electrode) of the switching element 1.

When the output voltage VEAO from the I-V converter 29 is lower than a light load detection lower limit voltage VR1 for detecting a light load, the light load detection circuit 32 stops the switching operation of the switching element 1. When the output voltage VEAO from the I-V converter 29 is higher than a light load detection upper limit voltage VR2 for detecting a light load, the light load detection circuit 32 outputs a control signal for controlling an intermittent operation so as to restart the switching operation of the switching element 1. The control circuit drives the control electrode (gate electrode) of the switching element 1 in response to the transformer reset detection signal from the transformer reset detection circuit 13 and the control signal from the light load detection circuit 32 to control the intermittent operation at light load.

The following will describe the schematic operations of the switching power supply unit configured thus. The following will describe the power supply operation of a semiconductor device for controlling a switching power supply which performs, when a light load is detected, the intermittent operation of switching performed by the switching element.

In FIG. 16, when the internal circuit increases to a reference voltage, the control circuit is started. Thereafter, when the voltage of a terminal 46 is increased by a capacitor 118 connected between a terminal 46 and a terminal 47 to reach a start voltage, the switching element 1 such as a power MOSFET is turned on. When the drain current of the switching element 1 reaches an overcurrent detection level which is determined by the feedback current of a photocoupler current to a phototransistor 110 from an output voltage detection circuit 106 connected to the secondary winding 103b of the transformer 103, the switching element 1 is turned off. When the switching element 1 is turned off, the drain voltage of the switching element 1 causes a ringing operation due to resonance between the inductance of the transformer 103 and a capacitance between the drain and source of the switching element 1.

When the semiconductor device for controlling the switching power supply is started once, the subsequent on signal is detected by the tertiary winding (bias winding) 103c of the transformer 103. The voltage of the bias winding is clamped at + to − level in the control circuit. When the voltage of the bias voltage is equal to or lower than a set value in the control circuit, the on signal is outputted. A resistor 116 and a capacitor 117 are connected to a bias winding detecting terminal 49. Time constants determined by the values of the resistor 116 and the capacitor 117 are adjusted so as to obtain timing to turn on the switching element 1 at the bottom of the drain voltage of the switching element 1.

These operations are repeated to obtain a desired output voltage Vo. In order to improve the efficiency of the power supply at light load, intermittent oscillation control (intermittent switching operation) is performed such that a feedback current equal to or higher than a certain value stops the switching operation of the switching element 1 and a feedback current equal to or lower than a certain value restarts the switching operation of the switching element 1. Thus, it is possible to improve the efficiency of the power supply at light load and reduce power consumption.

The controlling method of the switching operation of the switching element 1 is suitable for a market requiring low noise, high efficiency, and high output. This is because the controlling method is RCC control of quasi-resonance, a switching loss can be reduced when the switching element is turned on, and low noise is achieved. Further, since an intermittent switching operation is performed by intermittent oscillation control at light load, it is possible to suppress an increase in switching frequency, which generally causes a problem in RCC, at light load. A switching loss at light load is reduced to a certain degree.

However, in the conventional switching power supply unit, a return signal for restarting the switching operation in the intermittent switching operation is outputted according to a feedback current value. It is not possible to recognize the level of the drain voltage of the switching element when switching is restarted by the return signal, resulting in hard switching at the restart of switching. Thus, a switching loss occurs when the switching element is turned on.

Further, a capacitor of a relatively large capacitance is connected as the capacitor 118 between the drain and source of the switching element. Thus, when the switching element is turned on, a loss of $CV^2/2$ occurs. As a drain voltage increases, a larger loss is generated by the capacitor 118.

For these reasons, it is not possible to reduce the current loss of the switching element at light load or obtain sufficiently high power efficiency over a wide load area including a standby mode, thereby interfering with low cost and improvement in the efficiency of the switching power supply.

SUMMARY OF THE INVENTION

The present invention is devised to solve the conventional problems. An object of the present invention is to provide a semiconductor device for controlling a switching power supply whereby the current loss of a switching element at light load can be reduced to further reduce power consumption at light load, sufficiently high power efficiency can be readily obtained over a wide load area including a standby mode, and the efficiency of the switching power supply can be further improved at low cost.

In order to solve the problem, in a semiconductor device for controlling a switching power supply of the present invention, a direct-current input voltage is applied to a switching element via a primary winding of a transformer, a direct-current voltage obtained by rectifying and smoothing an alternating current generated on a secondary winding of the transformer is controlled by a switching operation of the switching element, and power is supplied to a load. The semiconductor device comprises a control circuit comprising: a transformer reset detection circuit for detecting the reset state of the transformer generated by the switching operation of the switching element, from an alternating voltage generated on a tertiary winding of the transformer, and outputting a transformer reset detection signal indicating the reset state; an I-V converter for converting into a voltage the value of a control current indicating a change in the direct-current voltage, the change being made according to the alternating current generated on the secondary winding of the transformer; and a light load detection circuit for outputting a control signal for controlling the intermittent operation of switching performed by the switching element when a light load is detected as a load state indicating the magnitude of power supply to the load, the light load being detected according to a change in output voltage from the I-V converter, the light load detection circuit outputting the control signal for controlling the intermittent operation such that the switching operation of the switching element is stopped when the output voltage from the I-V converter is lower than the light load detection lower limit voltage for detecting the light load and such that the switching operation of the switching element is restarted when the output voltage from the I-V converter is higher than the light load detection upper limit voltage for detecting the light load, the control circuit driving a control electrode of the switching element and controlling the intermittent operation in response to the transformer reset detection signal from the transformer reset detection circuit and the control signal from the light load detection circuit. The control circuit further comprises a switching-on controller which starts counting, by means of a counter circuit, the transformer reset detection signal from the transformer reset detection circuit when the switching operation is stopped in response to the control signal from the light load detection circuit, and controls the timing of switching on at the restart of the switching operation according to the order of the counting and the switching operation restarted in response to the control signal from the light load detection circuit. And the switching-on controller turns on switching at the restart of the switching operation when the transformer reset detection signal is outputted from the transformer reset detection circuit after the control signal is outputted, when the control signal indicating the restart of the switching operation is outputted from the light load detection circuit before the counting of the counter circuit.

In the semiconductor device for controlling the switching power supply of the present invention, the switching-on controller turns on switching at the restart of the switching operation at a time when the control signal is outputted, when the control signal indicating the restart of the switching operation is outputted from the light load detection circuit after the counting of the counter circuit.

In the semiconductor device for controlling the switching power supply of the present invention, the switching element and the control circuit are integrated on the same semiconductor substrate. The semiconductor device comprises at least, as external connection terminals on the semiconductor substrate, a switching element input terminal for inputting the input voltage to the switching element via the primary winding of the transformer, a switching element output terminal for outputting a switching current obtained by the switching operation of the switching element, a power supply terminal for supplying a direct-current voltage to the control circuit according to a current generated on the tertiary winding of the transformer in response to the switching operation of the switching element, a control terminal for inputting the control signal for controlling the intermittent operation of switching performed by the switching element, and a transformer reset detecting terminal for supplying the transformer reset detection signal to the transformer reset detection circuit.

As described above, according to the present invention, during the stop period of the intermittent operation, a comparison is made between the number of counts of the waveform of the transformer reset detection signal and a set count value having been set in the counter circuit. When a return control signal is outputted from the light load detection circuit before there is a match, control is performed to turn on the switching element according to the timing of the waveform of the transformer reset detection signal after the return control signal is outputted, thereby reducing a switching power loss caused by a resonant capacitor during an intermittent switching operation at light load.

For this reason, it is possible to reduce a current loss of the switching element under light load to further reduce power consumption under light load, to readily obtain sufficiently high power efficiency over a wide load area including a standby mode, and to further improve the efficiency of the switching power supply at low cost.

BRIEF DESRIPTION OF THE DRAWINGS

DESCRIPTION OF THE EMBODIMENTS

Referring to the accompanying drawings, the following will specifically describe a semiconductor device for controlling a switching power supply according to embodiments of the present invention.

Embodiment 1

A semiconductor device for controlling a switching power supply will be discussed below according to Embodiment 1 of the present invention.

Figure 1:
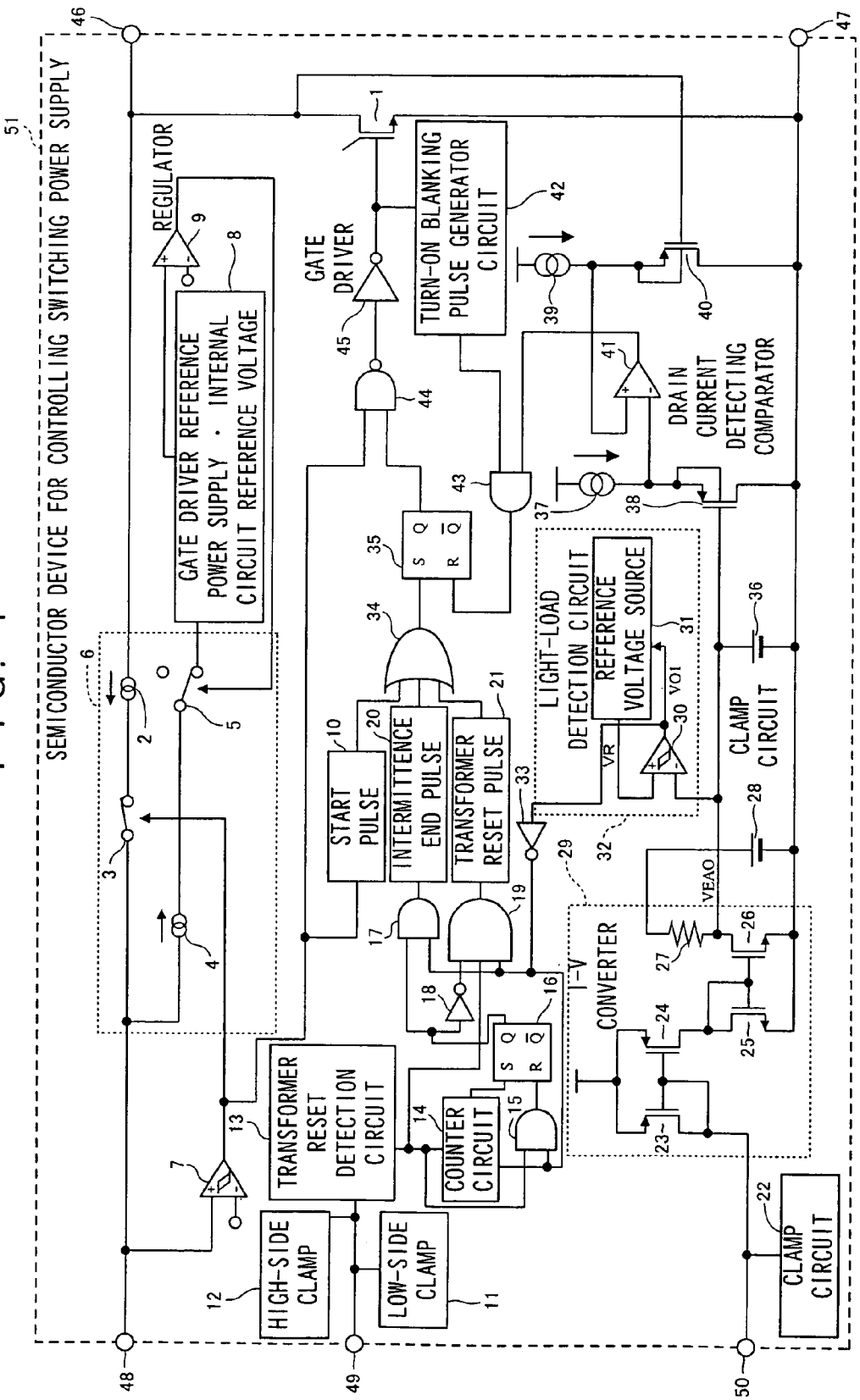
FIG. 1 is a circuit diagram showing a structural example of a semiconductor device for controlling a switching power supply according to Embodiment 1 of the present invention.
Figure 2:
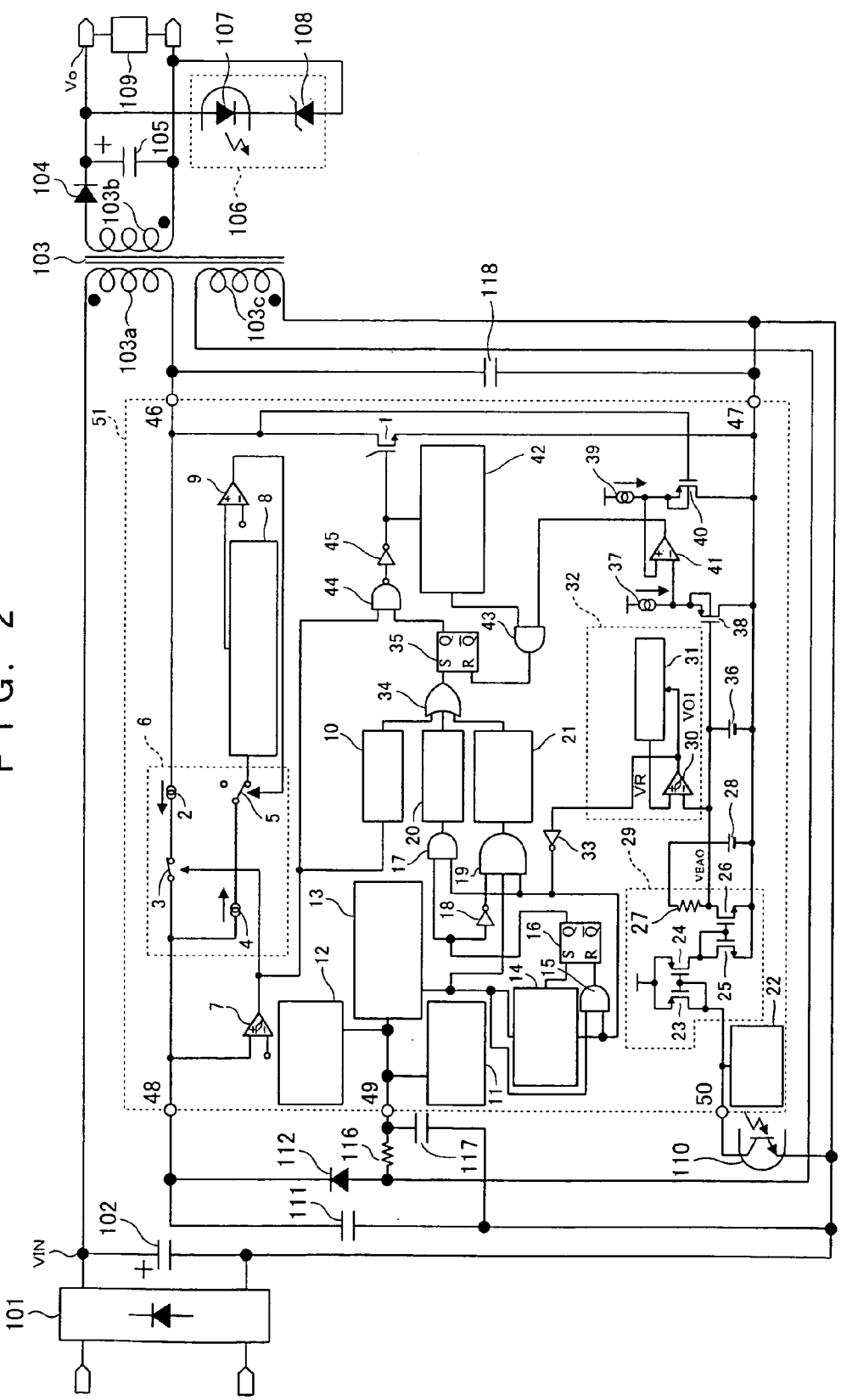
FIG. 2 is a circuit diagram showing a structural example of a switching power supply unit comprising the semiconductor device for controlling the switching power supply according to Embodiment 1.

FIG. 1 is a circuit diagram showing a structural example of the semiconductor device for controlling the switching power supply according to Embodiment 1. FIG. 2 is a circuit diagram showing a structural example of the switching power supply configured using the semiconductor device for controlling the switching power supply according to Embodiment 1.

In a semiconductor device 51 for controlling a switching power supply, a switching element 1 including a power MOSFET and a control circuit for performing switching control on the switching element 1 are integrated on the same semiconductor substrate. The semiconductor device 51 is constituted of five terminals: an input terminal 46 and an output terminal 47 of the switching element 1, a starting voltage detecting terminal of the semiconductor device 51 for controlling the switching power supply, a power supply terminal 48 of the control circuit, a control terminal 50 for inputting a control signal, and a voltage detecting terminal (transformer reset detecting terminal) 49 of a bias winding (tertiary winging) of a transformer 103.

A regulator 6 is connected between the input terminal 46 of the switching element 1, the starting voltage detecting terminal 48, the control circuit, and a gate driver reference power supply 8. When the voltage of the input terminal 46 of the switching element 1 is equal to or higher than a certain value, control is performed such that the internal circuit current of the semiconductor device 51 for controlling the switching power supply is supplied and a comparator 9 causes the control circuit of the semiconductor device 51 for controlling the switching power supply and the gate driver reference power supply 8 to have the voltage.

The output of a start/stop circuit comparator 7 is inputted to an NAND circuit 44 and the output signal of the NAND circuit 44 is outputted to the gate of the switching element 1 via a gate driver 45. The oscillation and stop of the switching element 1 are controlled according to the voltage of the terminal 48.

Reference numeral 22 denotes a clamp circuit which is connected to the control terminal 50 and is set at a constant voltage because a phototransistor 110 and so on are connected to the outside of the semiconductor device 51 for controlling the switching power supply.

Reference numeral 29 denotes an I-V converter which internally converts a current applied from the control terminal 50 into a voltage. A high-side clamp circuit 12 and a low-side clamp circuit 11 are connected to the terminal 49 for detecting the voltage of a bias winding 103c of the transformer 103 and regulates a voltage inputted to the inside of the semiconductor device 51 for controlling the switching power supply. Further, a transformer reset detection circuit 13 is connected to the terminal 49, and a one-shot pulse (transformer reset) generator circuit 21 determines the timing of the turn-on signal of the switching element 1.

Reference numeral 10 denotes a start pulse generator circuit which generates an output in response to the output signal, that is, the start signal of the comparator 7. The output signal is inputted to the set terminal of an RS flip-flop 35 via an OR circuit 34 and an output Q of the RS flip-flop 35 is inputted to the NAND circuit 44.

The output signal Q of the RS flip-flop 35 is set at H by a start pulse signal after startup and a one-shot (transformer reset) pulse signal during a normal operation via the OR circuit 34, and the switching element 1 is turned on.

After the switching element 1 is turned on, a voltage generated by a current applied to the switching element 1 and the on-resistance of the switching element 1, that is, an on voltage is inputted to the plus side of a drain current detecting comparator 41. A signal outputted when the on voltage becomes higher than the voltage of the minus side is subjected to AND processing according to a signal from an on blanking pulse generator circuit 42 and via an AND circuit 43, and inputted as the reset signal of the RS flip-flop 35. Thereafter, the switching element 1 is turned off. That is, a drain current is regulated by detecting the on resistance of the switching element 1.

Further, a voltage generated by a constant-current source 37 and a P-type MOSFET 38 is applied to the minus side of the drain current detecting comparator 41 based on an output voltage VEAO which has been internally converted by the I-V converter 29 according to a current applied from a clamp circuit 36 and the control terminal 50. The upper limit (maximum drain current) of a drain current is regulated by the clamp circuit 36, so that the drain current of the switching element 1 can be changed according to the level of the output voltage VEAO from the I-V converter 29. That is, as a current applied from the control terminal 50 increases, the output voltage VEAO of the I-V converter 29 decreases. Thus, the minus side of the drain current detecting comparator 41 decreases in voltage, so that the drain current of the switching element 1 decreases.

The output voltage VEAO of the I-V converter 29 that has been internally converted from the current of the control terminal 50 is detected, the voltage of the bias winding 103c of the transformer 103 is detected by the terminal 49, and the turning on/off period of the switching element 1 is determined by the output signal of the transformer reset pulse generator circuit 21 which generates a one-shot pulse from the output of the transformer reset detection circuit 13 for determining the timing to turn on the switching element 1.

In this switching power supply unit, a commercial AC power supply is rectified by a rectifier 101 such as a diode bridge and smoothed by an input capacitor 102, so that a direct-current voltage VIN is generated and is applied to the transformer 103 for converting power. The transformer 103 for converting power has a primary winding 103a, a secondary winding 103b, and the tertiary winding (used as a bias winding) 103c. The direct-current voltage VIN is applied to the primary winding 103a.

The direct-current voltage VIN applied to the primary winding 103a of the transformer 103 is switched by the switching element 1 in the semiconductor device 51 for controlling the switching power supply. Then, current is drawn to the secondary winding 103b of the transformer 103 by the switching operation of the switching element 1. The current drawn to the secondary winding 103b is rectified and smoothed by a diode 104 and a capacitor 105, which are connected to the secondary winding 103b, and the current is supplied to a load 109 as the direct-current power of an output voltage Vo.

For example, an output voltage detection circuit 106 constituted of an LED 107 and a Zener diode 108 is connected across the capacitor 105 and outputs a feedback signal for stabilizing the output voltage Vo to the primary-side phototransistor 110 connected to the control terminal 50 of the semiconductor device 51 for controlling the switching power supply.

The tertiary winding 103c of the transformer is connected to the bias winding voltage detecting terminal 49 and the starting voltage detecting terminal 48 via and a diode 112. A capacitor 111 prevents a sharp decrease on the terminal 48, that is, stabilizes the terminal 48. A resistor 116 and a capacitor 117, which are connected to the terminal 49, generate a delay time and adjust the time when the terminal 49 detects the reset of the transformer. A capacitor 118 connected between the input and output of the switching element 1 determines the magnitude and period of ringing caused by resonance with the transformer 103.

The semiconductor device 51 of FIG. 1 for controlling the switching power supply comprises a light load detection circuit 32 which is fed with the output voltage VEAO obtained by converting a current applied from the control terminal 50 into a voltage by means of the I-V converter 29. The light load detection circuit 32 comprises a light load detecting comparator 30. The output voltage VEAO outputted from the I-V converter 29 is applied as the minus input of the light load detecting comparator 30, and a reference voltage VR outputted from a reference voltage source 31 is applied as the plus input of the light load detecting comparator 30. The light load detecting comparator 30 compares the inputted output voltage VEAO and the reference voltage VR. When the output voltage VEAO is lower than the reference voltage VR, the light load detecting comparator 30 outputs a predetermined output signal VO1 to AND circuits 15, 17, and 19 via an inverter 33. The output signal VO1 of the light load detecting comparator 30 is also applied to the reference voltage source 31. The reference voltage source 31 changes the output voltage VR in response to the output signal VO1 of the light load detecting comparator 30.

A transformer reset detection signal is applied to the AND circuit 19 as a clock signal and another input signal. The detection signal is outputted from the transformer reset detection circuit 13 after the detection of the voltage of the transformer reset detecting terminal 49. The output of the AND circuit 19 is applied to the transformer reset pulse generator circuit 21 for generating a transformer reset pulse of one-shot pulse. When a light load is detected, that is, when the switching element 1 is stopped, the amplitude of resonance is reduced according to a stop time and thus a transformer reset signal may not be detected. For this reason, the transformer reset pulse generator circuit 21 is not permitted to operate.

The output signal of the transformer reset detection circuit 13 is inputted to the set terminal (S) of an RS flip-flop 16 via a counter circuit 14. The output signal of the AND circuit 15 is inputted to the reset terminal (R) of the RS flip-flop 16. The output signal of the transformer reset detection circuit 13 and a signal, which is inputted as the output signal VO1 of the light load detecting comparator 30 and is outputted via the inverter 33, are inputted to the AND circuit 15. The signal, which is inputted as the output signal VO1 of the light load detecting comparator 30 and is outputted via the inverter 33, is also inputted to the counter circuit 14. One output signal Q of the RS flip-flop 16 is inputted to the AND circuit 17 and the other output signal Q is inputted to the AND circuit 19 via an inverter 18. During a normal operation, H is inputted to the reset terminal (R) of the RS flip-flop and thus the output signal Q is set at L. L is inputted to one input of the AND circuit 17 and an intermittence end pulse generator circuit 20 is not permitted to operate. In the case of intermittent stop at light load, the signal, which is inputted as the output signal VO1 of the light load detecting comparator 30 and is outputted via the inverter 33, is set at L. When the signal is inputted to the counter circuit 14 and the counter circuit 14 starts receiving the output signal of the transformer reset detection circuit 13 and counts up to a predetermined number of counts, an H signal is outputted from the counter circuit 14 and H is inputted to the set terminal (S) of the RS flip-flop 16. Thus, the output signal Q is set at H and L is inputted to the AND circuit 19 via the inverter 18. At this point, the transformer reset pulse generator circuit 21 does not operate. This state is kept until return is made from the intermittent stop at light load, the output signal VO1 of the light load detecting comparator 30 is inputted as the H signal to the AND circuit 15 via the inverter 33, the output H signal of the transformer reset detection circuit 13 is inputted to the AND circuit 15, and H is inputted to the reset terminal (R) of the RS flip-flop 16. When an intermittent stop is made at light load and the output signal VO1 of the light load detecting comparator 30 is inputted as H via the inverter 33, that is, a return signal is outputted before the number of counts made by the counter circuit 14 reaches the predetermined number of counts, L is still inputted to the set terminal (S) of the RS flip-flop 16. Thus, an operation completely similar to a normal operation is performed after the output of the return signal.

The output VO1 of the light load detecting comparator 30 is inputted to the intermittence end pulse generator circuit 20 via the inverter 33 and the AND circuit 17. After the stop time, when the output signal Q of the RS flip-flop is H, the output of the intermittence end pulse generator circuit 20 is inputted to the OR circuit 34 and the output signal of the OR circuit 34 is inputted as the set signal of an RS flip-flop 35. The output signal of the RS flip-flop 35 is inputted to the NAND circuit 44 and the output of the NAND circuit 44 is outputted to the gate of the switching element (power MOSFET) 1 via the gate driver 45. In this way, when the light load detecting comparator 30 detects a light load, which is a standby state, the transformer reset detection circuit 13 is not operated. Switching control is performed so as to restart the switching of the switching element 1 in response to the output signal of the intermittence end pulse generator circuit 20.

As described above, by controlling intermittence at light load, it is possible to reduce a switching loss caused by the switching element 1 and improve the efficiency of the power supply at light load. In the conventional example, regardless of the state of a load, switching is restarted by a return pulse (intermittence stop end pulse) in response to the return signal of an intermittent operation.

When the internal power MOSFET serving as the switching element 1 is stopped (turned off) in the intermittent operation, due to resonance caused by L (inductance) of the transformer and a capacitance between D and S (a sum of the capacitance of a MOS and an external capacitance), ringing occurs on the drain voltage of the switching element 1.

When a load is reduced considerably and the intermittent operation is stopped for a long time, ringing decreases and the drain voltage is equal to a voltage around the center of oscillation. When the power MOSFET 1 is turned on by a return signal, the D-S capacitance causes a large loss. The loss is expressed by CV2/2. When the level of the drain voltage is high or the capacitance C is large, the loss becomes significantly large. However, when the stop time is long, a switching loss is considerably reduced by the long stop time, quasi-(partial) resonance occurs after return, and the MOSFET 1 is turned on at the bottom (0 V) of the drain voltage after recovery, so that the loss expressed by CV2/2 becomes negligible. That is, the loss is caused by the drain voltage and the external capacitor C only at the first ringing wave after the return of the intermittent operation.

However, when the stop time of intermittence is so short that stop and return are repeated in a short time, the loss expressed by CV2/2 becomes extremely large. Even if the intermittent operation is controlled to improve the efficiency of the power supply at light load, the loss may increase.

Hence, as shown in FIG. 1, after the switching operation of the power MOSFET 1 is stopped by the intermittent operation, the transformer reset detection signal, that is, ringing is counted. When the counts are not more than the predetermined number of counts, the switching element (power MOSFET) 1 is not turned on by a switching return signal during the intermittent operation but is turned on by the transformer reset detection signal inputted after the return signal. That is, the switching element 1 is turned on at the bottom of the drain voltage as in a normal state. This operation is effective when return and stop are repeated in a short time during the intermittent operation. Thus, even when ringing does not decrease so much, the switching element 1 can be turned on at the bottom of the drain voltage, thereby reducing the loss expressed by CV2/2.

The counter circuit 14 is reset at the detection of the transformer reset detection signal after the return of the intermittent operation. Thus, it is possible to fix the output of the counter until the switching element (power MOSFET) 1 is turned on after return.

The following will discuss operations performed at light load by the semiconductor device 51 configured thus for controlling the switching power supply and the switching power supply unit. The switching power supply unit is a ringing choke converter (RCC) using partial resonance and is a structural example for explaining Embodiment 1.

Figure 3:
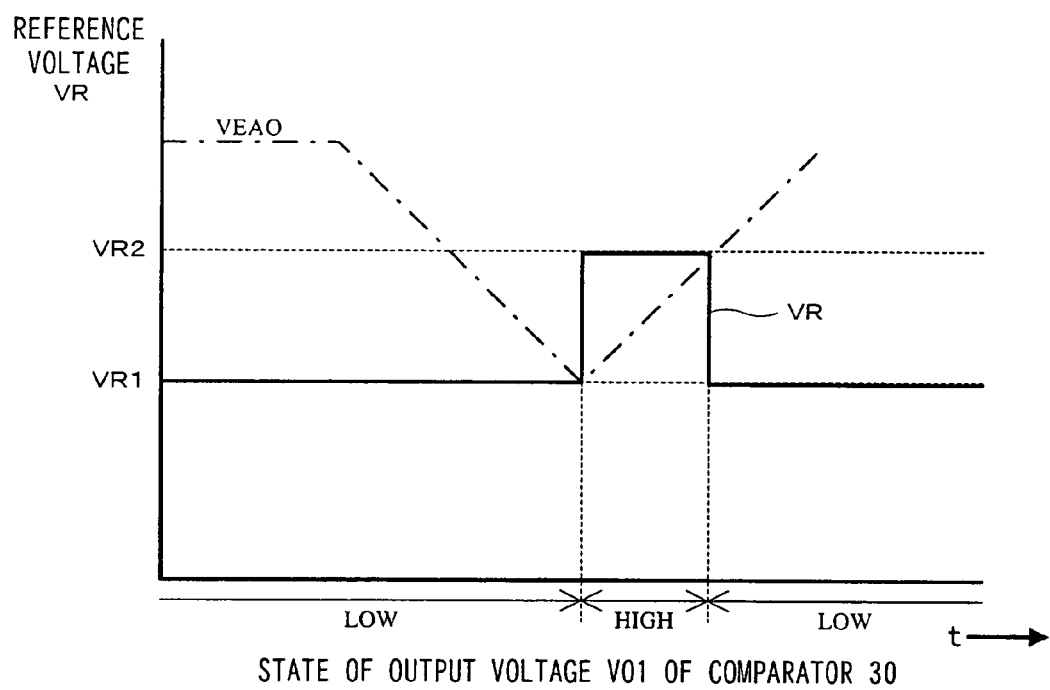
FIG. 3 is a time chart for explaining the operations of a reference voltage source of the semiconductor device for controlling the switching power supply according to Embodiment 1.
Figure 4:
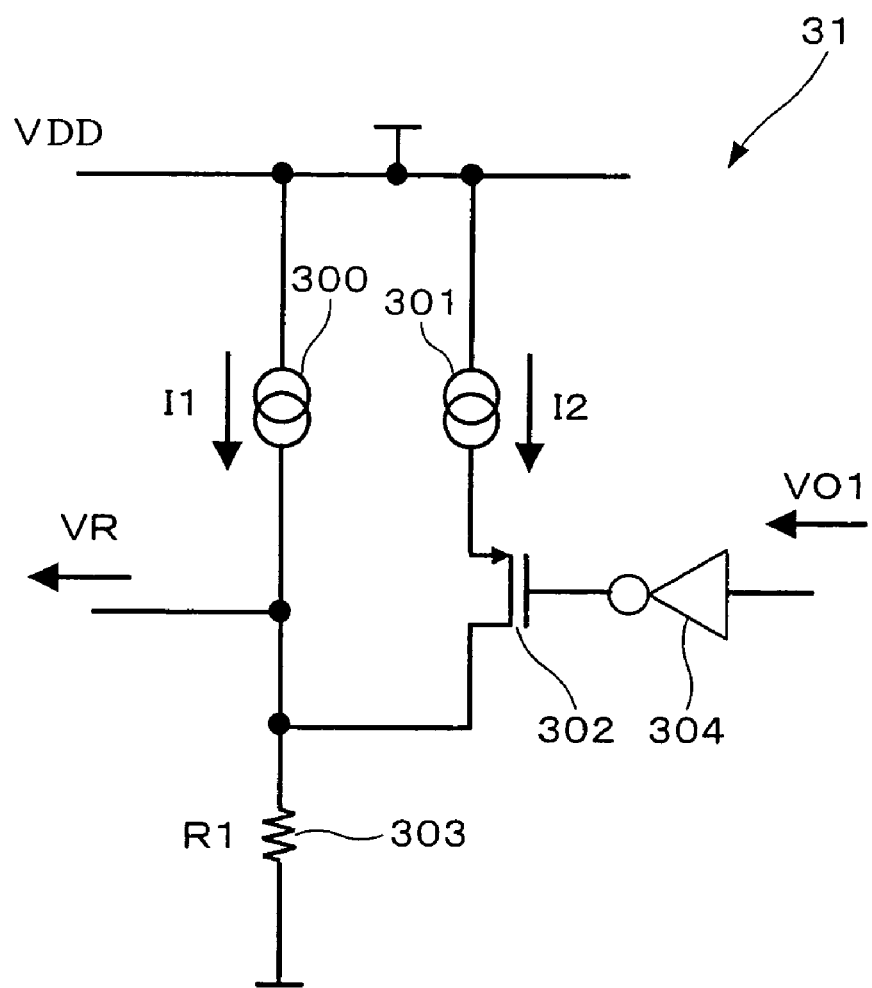
FIG. 4 is a circuit diagram showing a structural example of the internal circuit of the reference voltage source in the semiconductor device for controlling the switching power supply according to Embodiment 1.
Figure 5:
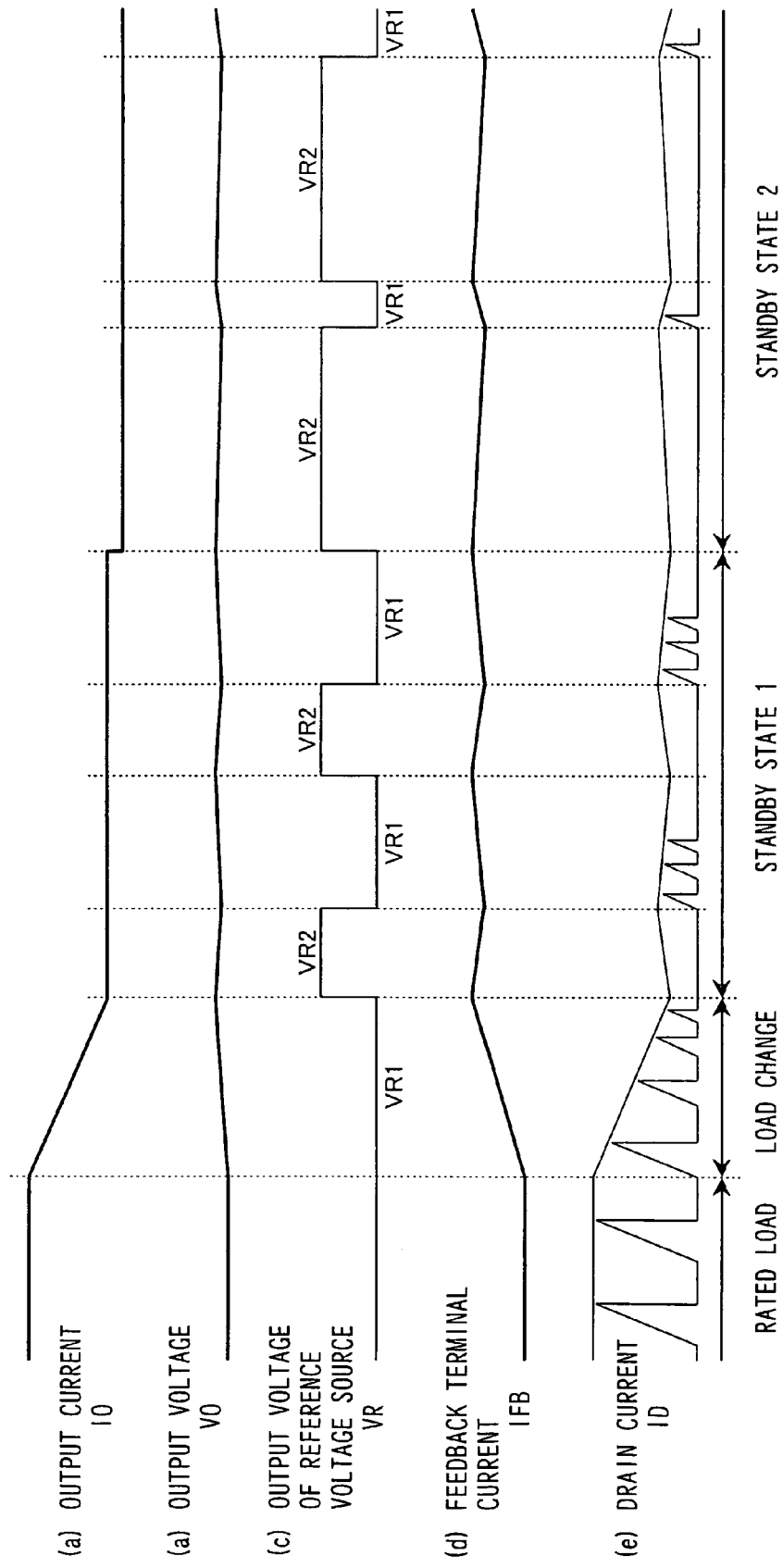
FIG. 5 is a time chart for explaining the operations of the semiconductor device for controlling the switching power supply according to Embodiment 1 and the switching power supply unit comprising the semiconductor device for controlling the switching power supply.

FIG. 3 is a time chart for explaining the operations of the reference voltage source of the semiconductor device for controlling the switching power supply according to Embodiment 1. FIG. 4 is a circuit diagram showing a structural example of the internal circuit of the reference voltage source in the semiconductor device for controlling the switching power supply according to Embodiment 1. FIG. 5 is a time chart for explaining the operations of the semiconductor device for controlling the switching power supply according to Embodiment 1 and the switching power supply unit comprising the semiconductor device for controlling the switching power supply.

When an AC power supply is inputted from a commercial power supply to the rectifier 101, the power supply is rectified and smoothed by the rectifier 101 and the capacitor 102 and is converted into the direct-current voltage VIN. The direct-current voltage VIN is applied to the primary winding 103a of the transformer 103. When the direct-current voltage VIN is equal to or higher than a certain value, charging current is applied to the capacitor 111 via the regulator 6 in the semiconductor device 51 for controlling the switching power supply. When the voltage of the terminal 48 of the semiconductor device 51 for controlling the switching power supply reaches a starting voltage set by the start/stop comparator 7, control is started for the switching operation of the switching element 1.

A start pulse is generated by a start pulse generator circuit 10 based on the output signal of the start/stop comparator 7 and the switching element 1 is turned on. Since the secondary side has a low output upon startup, no current is applied to the Zener diode 108 of the output voltage detection circuit 106 and thus no current is applied to the phototransistor 110. Therefore, the output voltage VEAO of the I-V converter 29 has a higher level than the clamp circuit 36 and the minus side of the drain current detecting comparator 41 is set at a voltage determined by the clamp circuit 36. When a start pulse is generated by the start pulse generator circuit 10 and the switching element 1 is turned on, a current is applied to the switching element 1 and an on voltage determined by a product of an on resistance is inputted to the plus side of the drain current detecting comparator 41. When the on voltage exceeds a voltage determined on the minus side, H is inputted to the reset terminal signal of the RS flip-flop 35 and the switching element 1 is turned off.

Thereafter, the voltage of the tertiary winding (bias winding) 103c of the transformer 103 is changed from positive to negative, that is, the input terminal 46 of the switching element 1 decreases in voltage due to resonance determined by the inductance of the transformer 103 and a capacitance between input and output of the capacitor 118 and the switching element 1. At this point, a one-shot pulse signal is inputted as H by the transformer reset detection circuit 13 from the transformer reset pulse generator circuit 21 to the set terminal of the RS flip-flop 35 via the OR circuit 34, and the switching element 1 is turned on.

The detection time of the transformer reset detection circuit 13 is adjusted by the resistor 116 and the capacitor 117 which are connected between the tertiary winding (bias winding) 103c of the transformer 103 and the terminal 49. When the input terminal 46 of the switching element 1 is almost 0 volts, the switching element 1 is turned on.

The output voltage Vo is increased by repeating the above-described switching operation. When the output voltage Vo is equal to or higher than a voltage set by the output voltage detection circuit 106, the LED 107 is brought into conduction, a current is applied to the phototransistor 110, and a current is applied from the control terminal 50 of the semiconductor device 51 for controlling the switching power supply. Since the output voltage VEAO of the I-V converter 29 decreases with the applied current, the drain current detecting comparator 41 decreases in current on the minus side and thus the drain current of the switching element 1 decreases. In this way, the on duty of the switching element 1 is changed to a proper state. That is, switching is turned on by the one-shot pulse outputted from the transformer reset pulse generator circuit 21 in response to the output signal from the transformer reset detection circuit 13, and the on duty of the switching element 1 is determined by the current applied from the control terminal 50.

That is, under light-load conditions where a small amount of current is applied to the load 109, a current IDS is applied to the switching element 1 for a short time. Under heavy-load conditions, the current IDS is applied to the switching element 1 for a long time.

In this way, the semiconductor device 51 for controlling the switching power supply controls the drain current IDS of the switching element 1 and changes the on duty according to power supplied to the load 109 of the switching power supply. Further, the timing to turn on the switching element 1 is set so as to produce output when the input voltage of the switching element 1 is reduced to the minimum during resonance, so that a switching loss hardly occurs in a turned-on state. That is, partial resonance is performed so as to make a switching loss negligible in the turned-on state. These operations can realize higher efficiency and low noise during normal operations.

The light load detecting comparator 30 compares the output voltage VEAO, which is obtained by converting a current applied from the control terminal 50 into a voltage by means of the I-V converter 29, and the output voltage VR of the reference voltage source 31. The output voltage VR of the reference voltage source 31 first serves as a light load detection lower limit voltage VR1 (rated load in FIG. 5). In a standby state or the like where the load 109 connected to the output of the switching power supply decreases in current supply, as current supply to the load decreases, the output voltage Vo increases (a load change in FIG. 5) and the current of the phototransistor 110 from the LED 107 also increases. This current increases a current applied from the control terminal 50 and thus the converted voltage VEAO of the I-V converter 29 decreases according to formula (1) below:

$$VEAO = V0 - R \times I \quad (1)$$

where V0 represents a predetermined reference voltage of a reference voltage source 28, R represents a resistance of a resistor 27, and I represents a value of current passing through the resistor 27. The current is obtained by internal mirror circuits 23 to 26 which convert a current applied from the control terminal 50.

Therefore, according to formula (1), as a current flowing from the control terminal 50 increases, the output voltage VEAO of the I-V converter 29 decreases. Accordingly, the reference voltage source (minus side) of the drain current detecting comparator 41 decreases, the drain current of the switching element 1 gradually decreases, and power supply to the load 109 also decreases. When the converted voltage VEAO of the I-V converter 29 is lower than the light load detection lower limit voltage VR1, a light load is detected and the output signal VO1 of the light load detecting comparator 30 changes from a low level to a high level as shown in FIG. 3.

Thus, the output of the AND circuit 19 that has passed through the inverter 33 becomes a low level and the one-shot pulse signal of the transformer reset pulse generator circuit 21 is not outputted, thereby stopping the switching operation of the switching element 1. At the same time, the output voltage VR of the reference voltage source 31 is changed from the light load detection lower limit voltage VR1 to a light load detection upper limit voltage VR2 in response to the output signal VO1 of the light load detecting comparator 30 (standby states (1) and (2) in FIG. 5).

When the switching operation of the switching element 1 is stopped and the switching element 1 is turned off, no current flows to the switching element 1. Accordingly, no power is supplied to the load 109 and thus the output voltage Vo to the load 109 gradually decreases. Therefore, the output voltage VEAO of the I-V converter 29 gradually increases. Since the output voltage of the reference voltage source 31 is the light load detection upper limit voltage VR2, which is higher than the light load detection lower limit voltage VR1, the switching operation of the switching element 1 is not immediately restarted as shown in FIG. 3.

As shown in FIG. 3, when the output voltage Vo to the load 109 further decreases and the output voltage VEAO of the I-V converter 29 exceeds the light load detection upper limit voltage VR2, the output signal VO1 of the light load detecting comparator 30 becomes a low level. In response to the signal (i.e., a return signal), the switching operation of the switching element 1 is restarted in the following two cases:

(1) When the switching element 1 is stopped and the switching operation return signal of the switching element 1 is inputted before the number of times of ringing performed by the transformer reset detection circuit 13 in the switching element 1 reaches the number of counts set by the counter circuit 14, the transformer reset detection signal is received which has been detected by the transformer reset detection circuit 13 after the return signal, the switching operation of the switching element 1 is restarted by the one-shot pulse of the transformer reset pulse generator circuit 21, and then the switching element 1 performs switching in response to the normal one-shot pulse output signal of the transformer reset pulse generator circuit 21.

(2) When the switching element 1 is stopped and the switching operation return signal of the switching element 1 is inputted after the number of times of ringing performed by the transformer reset detection circuit 13 in the switching element 1 reaches the number of counts set by the counter circuit 14, a one-shot pulse for return is outputted by the intermittence end pulse generator circuit 20 after passing though the inverter 33, and the switching operation of the switching element 1 is restarted. At the same time, the transformer reset detection circuit 13 having been stopped by the AND circuit 19 becomes effective, and the turning on/off of normal quasi-(partial) resonance is restarted in the switching element 1 in response to the one-shot pulse output signal of the transformer reset pulse generator circuit 21 (FIG. 5).

As shown in FIG. 3, when the output voltage VEAO of the I-V converter 29 increases higher than the light load detection upper limit voltage VR2 and the output signal VO1 of the light load detecting comparator 30 becomes a low level, the output voltage VR of the reference voltage source 31 is changed from the standby (light load) detection upper limit voltage VR2 to the standby (light load) detection lower limit voltage VR1. When the switching operation of the switching element 1 is restarted, the on-duty of the switching element 1 is larger than that obtained at the detection of a light load. Thus, excessive power is supplied to the load 109, the output voltage Vo to the load increases again, and the output voltage VEAO of the I-V converter 29 decreases. When a light load is detected again, the switching operation performed by repeatedly turning on/off the switching element 1 is stopped.

In this way, the output voltage VR from the reference voltage source 31 is changed from the light load detection lower limit voltage VR1 to the light load detection upper limit voltage VR2 by detecting a light load. Thus, during the detection of a standby state, switching control of repeatedly turning on/off the switching element 1 exhibits intermittent oscillation (intermittent switching operation), in which stop and restart are repeated.

The output voltage Vo to the load 109 decreases when the intermittent oscillation is stopped. The degree of reduction depends upon a current supplied to the load 109. That is, the output voltage Vo of the load 109 decreases gently as current consumed in the load 109 decreases, and the stop period of the intermittent oscillation becomes longer as current consumed by the load 109 decreases. Thus, as the load becomes lighter, the number of switching operations of the switching element 1 decreases.

The reference voltage source 31 shown in FIG. 4 is constituted of a constant-current source 300 for determining the output voltage VR of the reference voltage source 31, a constant-current source 301, a resistor 303, a switching element 302 such as a P-type MOSFET, and an inverter circuit 304.

The constant-current source 300 supplies a constant current I1 and is connected to the resistor 303. The constant-current source 301 supplies a constant current I2 and is connected to the resistor 303 via the switching element (P-type MOSFET) 302. The output signal VO1 of the light load detecting comparator 30 is inputted to an input terminal such as the gate of the switching element 302 via the inverter circuit 304. A voltage generated by the constant-current source 300, the constant-current source 301, and the resistor 303 is outputted as the output voltage VR of the reference voltage source 31 and is inputted to the plus terminal of the light load detecting comparator 30.

The following will discuss the operations of the light load detection circuit 32 configured thus.

As shown in FIG. 3, before a light load is detected, the output signal VO1 of the light load detecting comparator 30 is set at a low level (LOW) and thus the switching element 302 is turned off. Therefore, the output signal VR of the reference voltage source 23 at this point, i.e., the light load detection lower limit voltage VR1 is expressed by formula (2) below:

$$VR1 = R1 \times (I1) \qquad (2)$$

On the other hand, when a light load is detected, the output signal VO1 of the light load detecting comparator 30 is set at a high level (HIGH). Thus, the switching element 302 is turned on and the current I2 supplied from the constant-current source 301 flows to the resistor 303. Therefore, the output signal VR of the reference voltage source 31 at this point, i.e., the light load detection upper limit voltage VR2 is expressed by formula (3) below:

$$VR2 = R1 \times (I1 + I2) \qquad (3)$$

As shown in FIG. 3, the output voltage VR of the reference voltage source 31 becomes equal to the light load detection lower limit voltage VR1 or the light load detection upper limit voltage VR2 according to the output signal VO1 of the standby detecting comparator 30, thereby exhibiting intermittent oscillation in a standby state. Due to the bottom on of the drain voltage of the intermittent switching operation and the counter circuit, the efficiency of the power supply at light load can be improved from the conventional art.

In Embodiment 1, the constant current value for setting the output voltage of the reference voltage source 31 is changed according to the output signal VO1 of the light load detecting comparator 30. A resistance for setting the output voltage of the reference voltage source 31 may be changed according to the output signal VO1 of the light load detecting comparator 30.

The following will describe operations corresponding to waveforms of a load connected to a direct-current output from the secondary winding 103b of the transformer 103. The state of the load is divided into a rated load state, a standby state (1), and a standby state (2).

Figure 6:
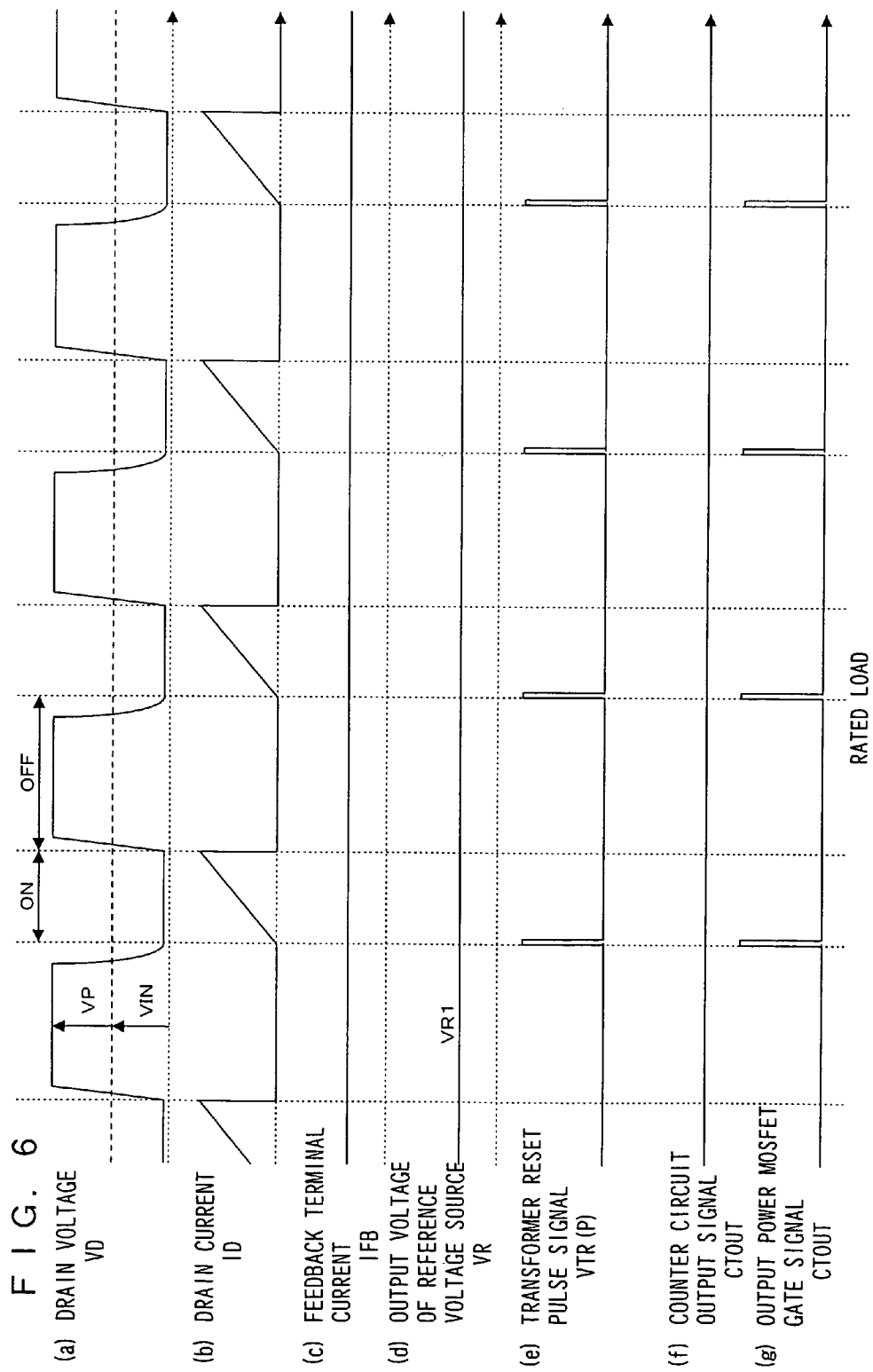
FIG. 6 is a waveform chart showing the start of switching at rated load in the semiconductor device for controlling the switching power supply according to Embodiment 1.
Figure 7:
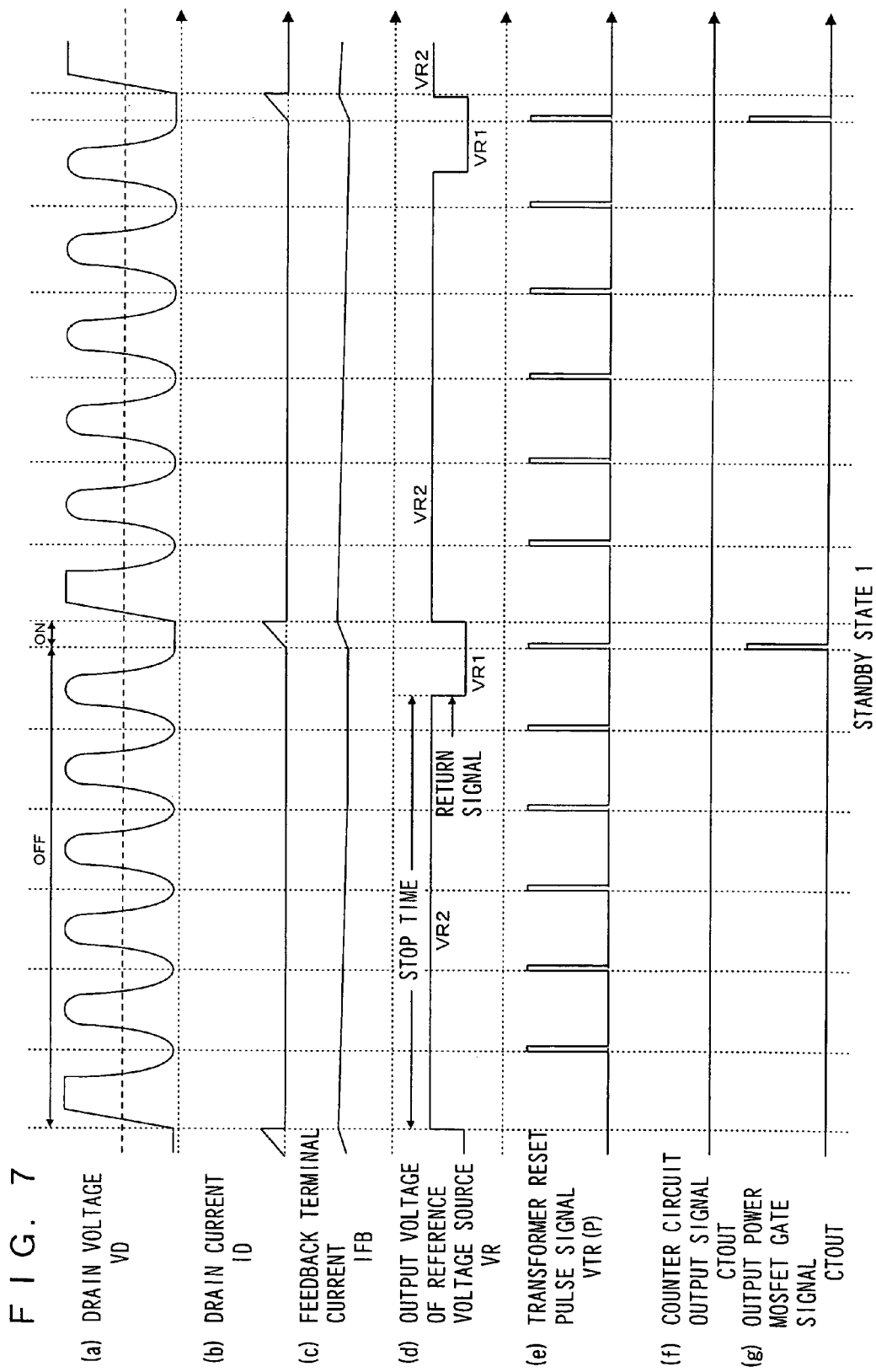
FIG. 7 is a waveform chart showing the start of switching in standby state 1 in the semiconductor device for controlling the switching power supply according to Embodiment 1.
Figure 8:
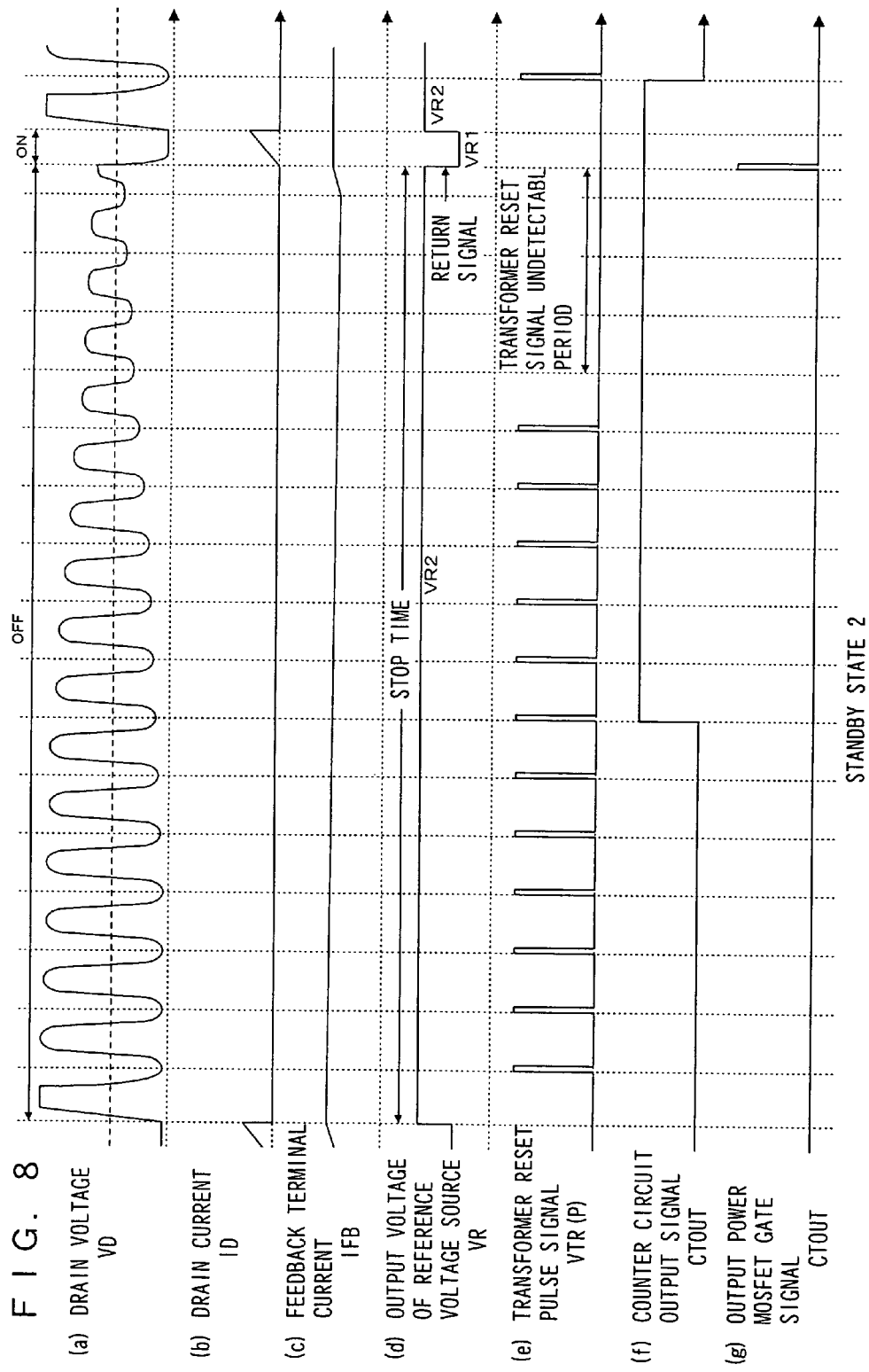
FIG. 8 is a waveform chart showing the start of switching in standby state 2 in the semiconductor device for controlling the switching power supply according to Embodiment 1.

FIG. 6 is a waveform chart showing the start of switching at rated load in the semiconductor device for controlling the switching power supply according to Embodiment 1. FIG. 7 is a waveform chart showing the start of switching in the standby state (1) in the semiconductor device for controlling the switching power supply according to Embodiment 1. FIG. 8 is a waveform chart showing the start of switching in the standby state (2) in the semiconductor device for controlling the switching power supply according to Embodiment 1.

First FIG. 6 shows normal quasi-resonance. Since the intermittent operation is not performed, the output voltage of the reference voltage source 31 is at VR1 and the output signal of the counter is at L level.

FIG. 7 shows a load when the intermittent operation is performed with a short stop/return time (stop time). The return signal is outputted before the transformer reset detection signal (transformer reset pulse signal) reaches the predetermined number of counts. Thus, the output signal of the counter circuit 14 is kept at L level. In this case, control is performed such that the switching element (power MOSFET) 1 is turned on by the transformer reset detection signal having been inputted after the return signal. Thus, the bottom on, that is, quasi-resonance is performed even in the intermittent operation.

FIG. 8 shows that the stop time is longer than the predetermined number of counts. In this case, since the output signal of the counter circuit is at H level at the timing of the return signal, the switching element (power MOSFET) 1 is turned on by the return signal. As shown in FIG. 1, the reset signal of the counter circuit becomes the transformer reset detection signal after return. The output of the counter circuit is kept until the transformer reset detection signal is detected after return. That is, a transition is made to a normal operation after the detection of the transformer reset detection signal. Therefore, when the stop time is longer than the predetermined number of counts, the switching element 1 is turned on by the return signal at the first turn-on after return, so that quasi-resonance does not occur. In the subsequent turn-on, a transition is made to normal quasi-resonance.

Regarding the timing of counting, the counter circuit 14 determines a set count value as timing with the optimum number of counts for the number of waves of a drain voltage waveform according to a used load such that the switching element 1 in the intermittent operation has power consumption equal to or smaller than a predetermined value based on the drain voltage waveform, which indicates the input terminal voltage of the switching element 1 when the switching operation is stopped.

The counter circuit 14 resets the count value when the control signal (return signal), which indicating the restart of the switching operation, is outputted from the light load detection circuit 32.

Embodiment 2

A semiconductor device for controlling a switching power supply will be discussed below according to Embodiment 2 of the present invention.

Figure 9:
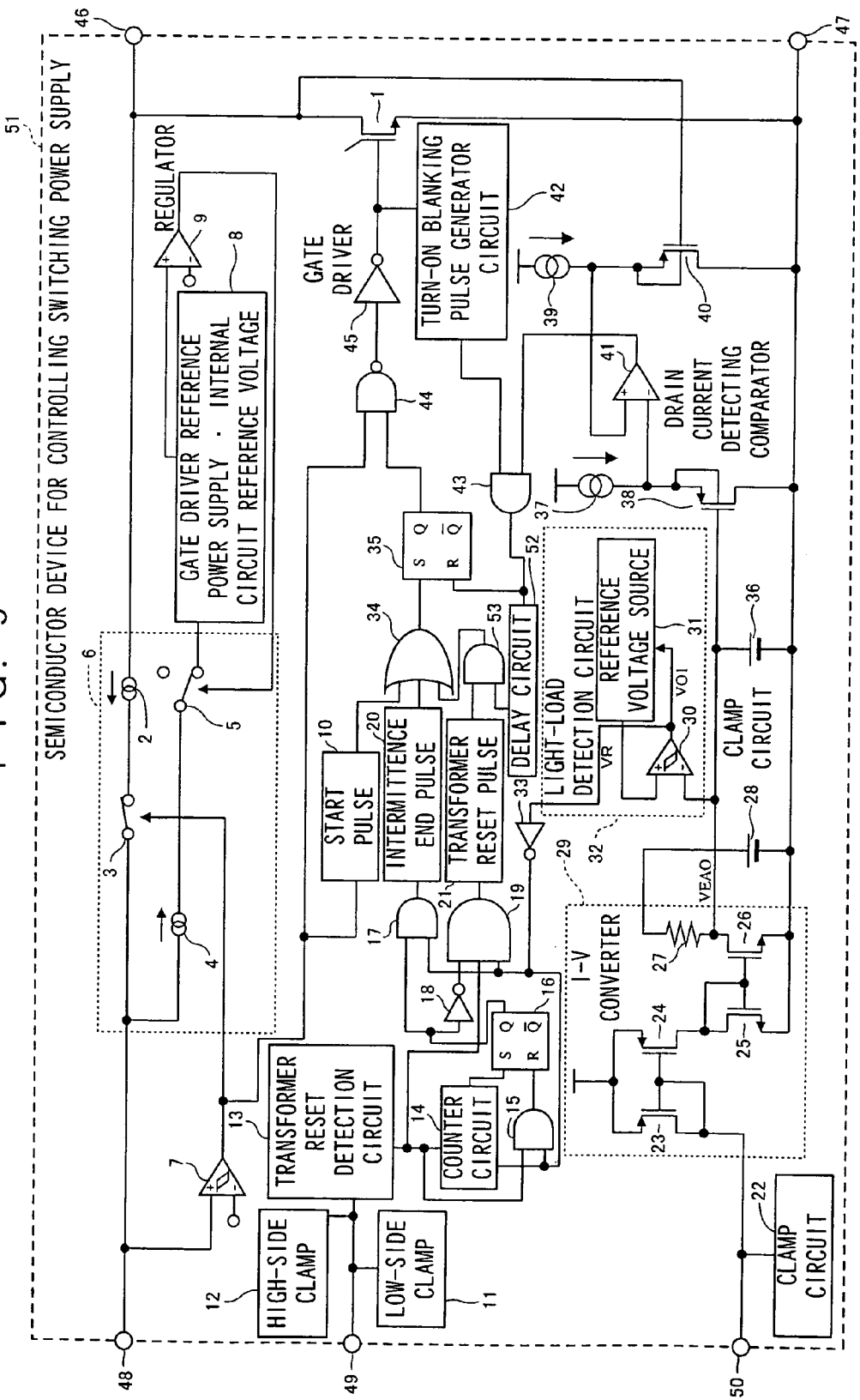
FIG. 9 is a circuit diagram showing a structural example of a semiconductor device for controlling a switching power supply according to Embodiment 2 of the present invention.
Figure 10:
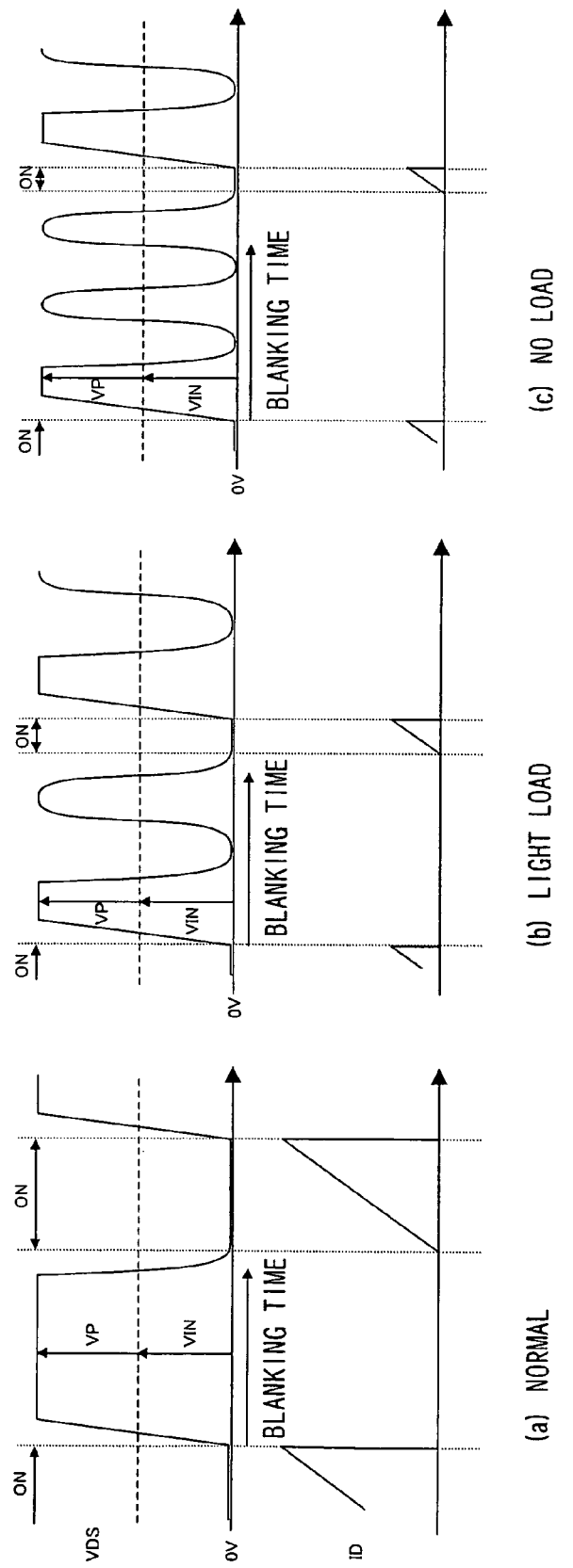
FIG. 10 is a waveform chart showing a switching operation in the semiconductor device for controlling the switching power supply according to Embodiment 2.
Figure 11:
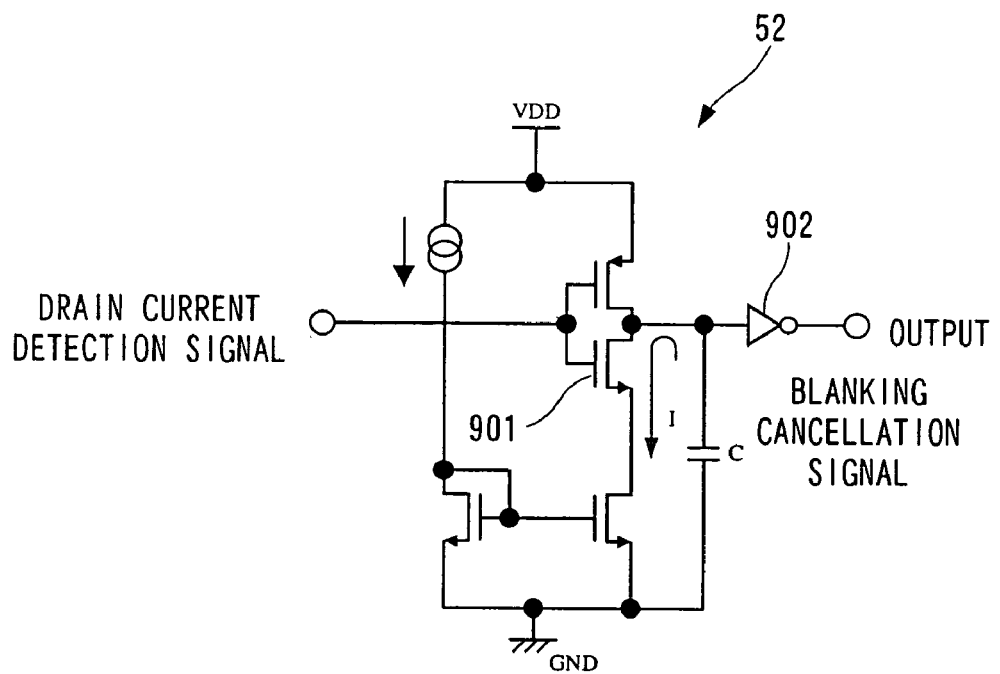
FIG. 11 is a circuit diagram showing a structural example of a delay circuit in the semiconductor device for controlling the switching power supply according to Embodiment 2.

FIG. 9 is a circuit diagram showing a structural example of a semiconductor device for controlling a switching power supply according to Embodiment 2. FIG. 10 is a waveform chart showing a switching operation in the semiconductor device for controlling the switching power supply according to Embodiment 2. FIG. 11 is a circuit diagram showing a structural example of a delay circuit in the semiconductor device for controlling the switching power supply according to Embodiment 2.

FIG. 9 shows that a delay circuit 52 is added to FIG. 1. The following will discuss the meaning of the delay circuit 52.

First, the limit of the maximum frequency will be discussed below.

Quasi-resonance is made by a ringing choke converter (RCC) Since self-excitation is basically obtained, the lighter load, the higher oscillation frequency.

Noise is strictly restricted in a power supply. When an oscillation frequency is not lower than 150 kHz, high frequency noise occurs. In general, the high frequency noise is radio noise in a frequency band (150 kHz to 1 GHz) causing electromagnetic interference. The noise is broadly divided into conducting noise which propagating through a power supply line and so on and radiating noise which radiates out into space.

Hence, the maximum frequency is limited to prevent an oscillation frequency from increasing at light load to a frequency band causing high frequency noise.

The following will describe that the efficiency of the power supply is improved by reducing a switching loss at light load.

When an oscillation frequency increases at light load, the number of times of switching increases per unit time. Therefore, a switching loss occurring upon switching increases and thus the oscillation frequency is limited to a certain frequency or lower to reduce the loss.

In this delaying method, when an off signal is outputted to a switching element (power MOSFET) 1, that is, after a drain current is detected by the on resistance of the switching element (power MOSFET) 1 according to a load, the delay circuit 52 is inserted between the signal of the switching element 1 and an AND circuit 53 in which one input is a transformer reset pulse signal. An on signal from a transformer reset pulse generator circuit 21 is outputted when an AND of the off signal is obtained at the detection of a drain current, that is, at the input of a transformer reset pulse signal (on signal) when the switching element 1 is turned off in response to the detection of a drain current. Thus, the switching element (power MOSFET) 1 is not turned on even by the input of the transformer rest pulse signal unless the off signal is inputted to the AND circuit 53 in response to the detection of a drain current.

Hence, when the off signal in response to the detection of a drain current is delayed for a certain period of time by the delay circuit 52, the switching element (power MOSFET) 1 is not turned on in the delay time even by the output of the transformer reset pulse signal (on signal) generated by ringing to the AND circuit 53. Thus, by determining the delay time (that is, masking time in an on state made by the transformer reset pulse signal), the switching element (power MOSFET) 1 is not turned on even when the transformer reset detection signal is inputted in a shorter time than the delay time.

In an actual operation, when an oscillation frequency is high at light load and masking time is inputted after the transformer reset detection signal, ringing is skipped one time and the switching element (power MOSFET) 1 is turned on by the subsequent transformer reset detection signal, so that the above-described effect is obtained.

Referring to FIG. 10, the following will discuss a normal load, a light load, no load of the semiconductor device for controlling the switching power supply having the delay circuit 52 as shown in FIG. 9.

As shown in FIG. 10, as a load becomes lighter from a normal load (FIG. 10(A)) to a light load (FIG. 10(B)) and no load (FIG. 10(C)), an oscillation frequency increases. However, in a blanking time during which the transformer reset pulse signal having a waveform corresponding to the waveform of a drain voltage VDS of the switching element (power MOSFET) 1 is masked for the delay time by the delay circuit 52, the switching element (power MOSFET) 1 is not turned on and thus a drain current ID does not flow, so that a frequency does not become higher than a certain frequency.

That is, as a load becomes lighter and the period of the transformer reset pulse signal for turning on the switching element (power MOSFET) 1 becomes shorter, as shown in FIGS. 10(B) and 10(C), the number of skips made by the blanking time increases relative to the timing to turn on the power MOSFET 1 in the waveform of the transformer reset pulse signal corresponding to the drain voltage VDS of the power MOSFET 1. Thus, during this period, even when the drain voltage VDS is 0 V, the drain current ID is not applied and an oscillation frequency upon switching does not become higher than the certain frequency.

Referring to FIG. 11, a structural example of the delay circuit 52 will be discussed below.

In the delay circuit 52 shown in FIG. 11, when the off signal to the power MOSFET 1 is received and H level is inputted as a drain current detection signal, a NchMOS 901 is turned on. Thus, charge is extracted at a constant current I from a capacitance C which has been charged to the level of VDD in an initial state. That is, the capacitance C is discharged at the constant current I. When the voltage of the capacitance C exceeds the threshold value of an inverter 902 and reaches L level, an output blanking cancellation signal for canceling the blanking time for masking output is at H level.

Mask time t is determined by t=CV/I. V is determined by VDD voltage−the threshold voltage of the inverter 902. For example, when I=1 µA, C=3 pF, and V=2.8 V are established, the delay time is t=8.4 µs.

Embodiment 3

A semiconductor device for controlling a switching power supply will be discussed below according to Embodiment 3 of the present invention.

Figure 12:
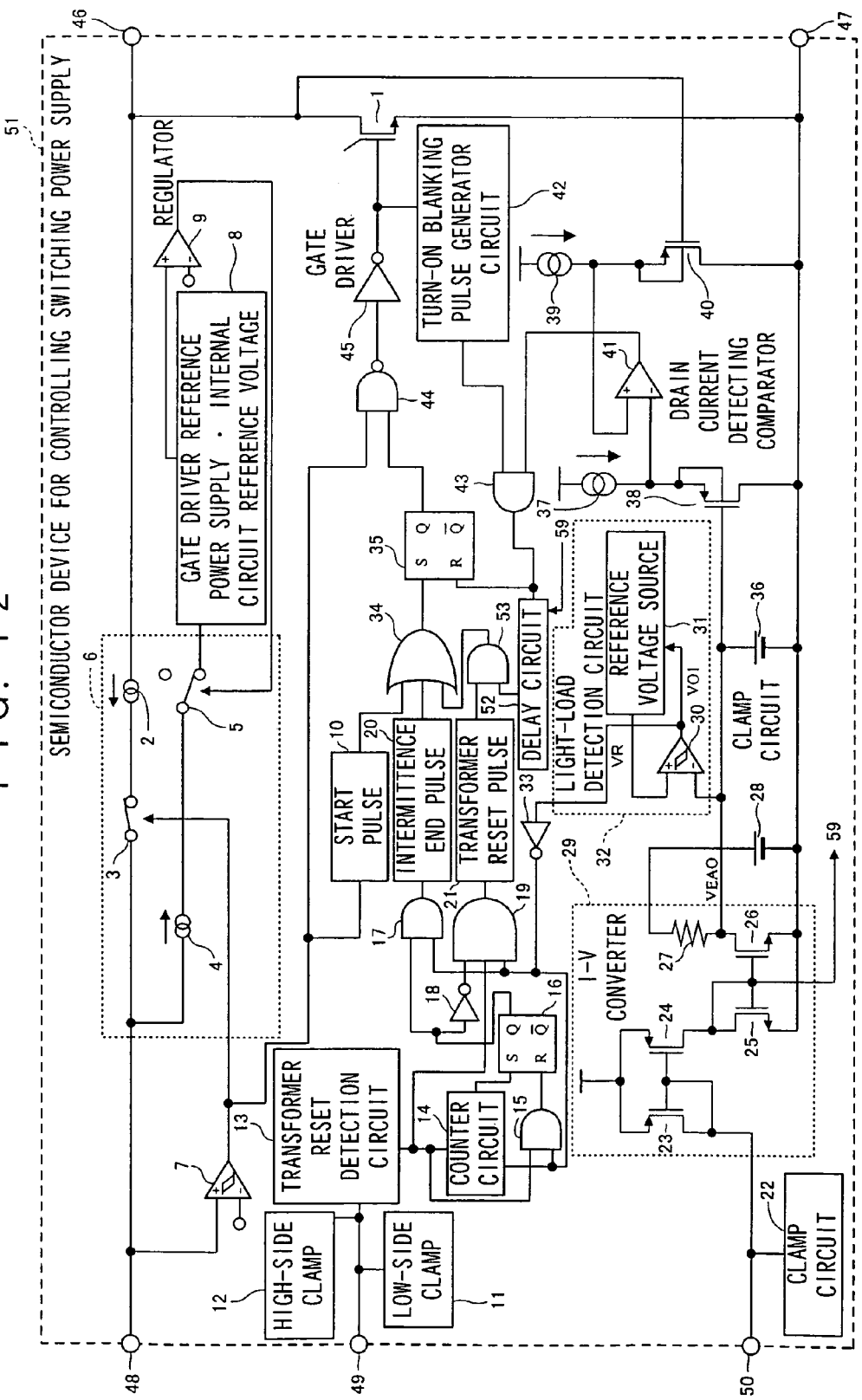
FIG. 12 is a circuit diagram showing a structural example of a semiconductor device for controlling a switching power supply according to Embodiment 3 of the present invention.
Figure 13:
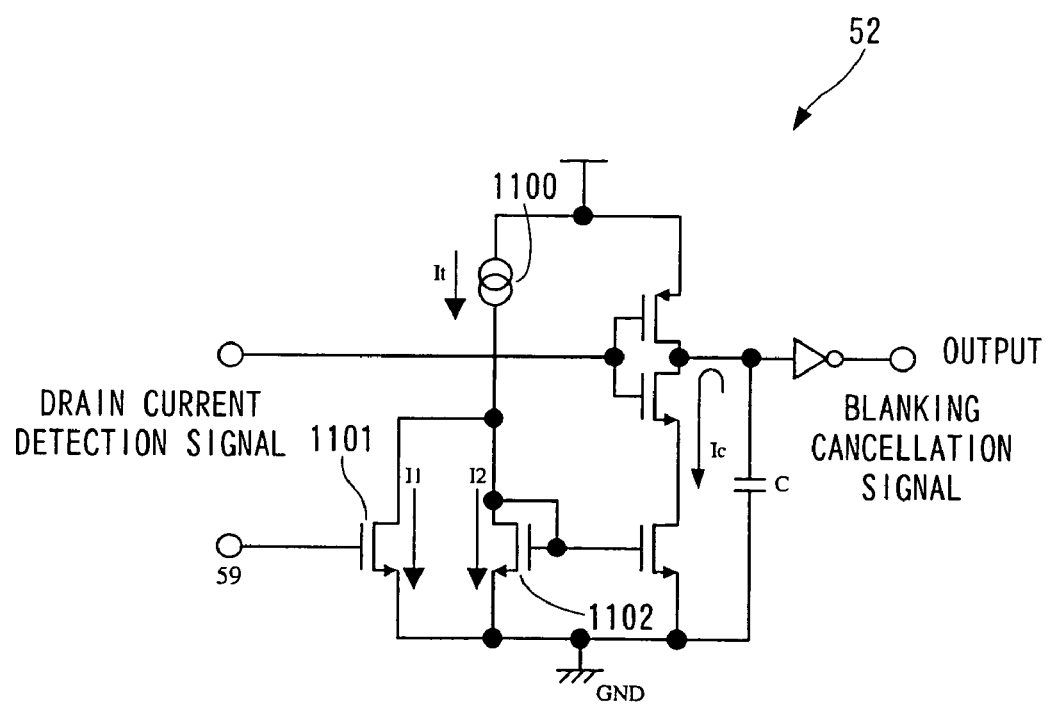
FIG. 13 is a circuit diagram showing a structural example of a delay circuit in the semiconductor device for controlling the switching power supply according to Embodiment 3.
Figure 14:
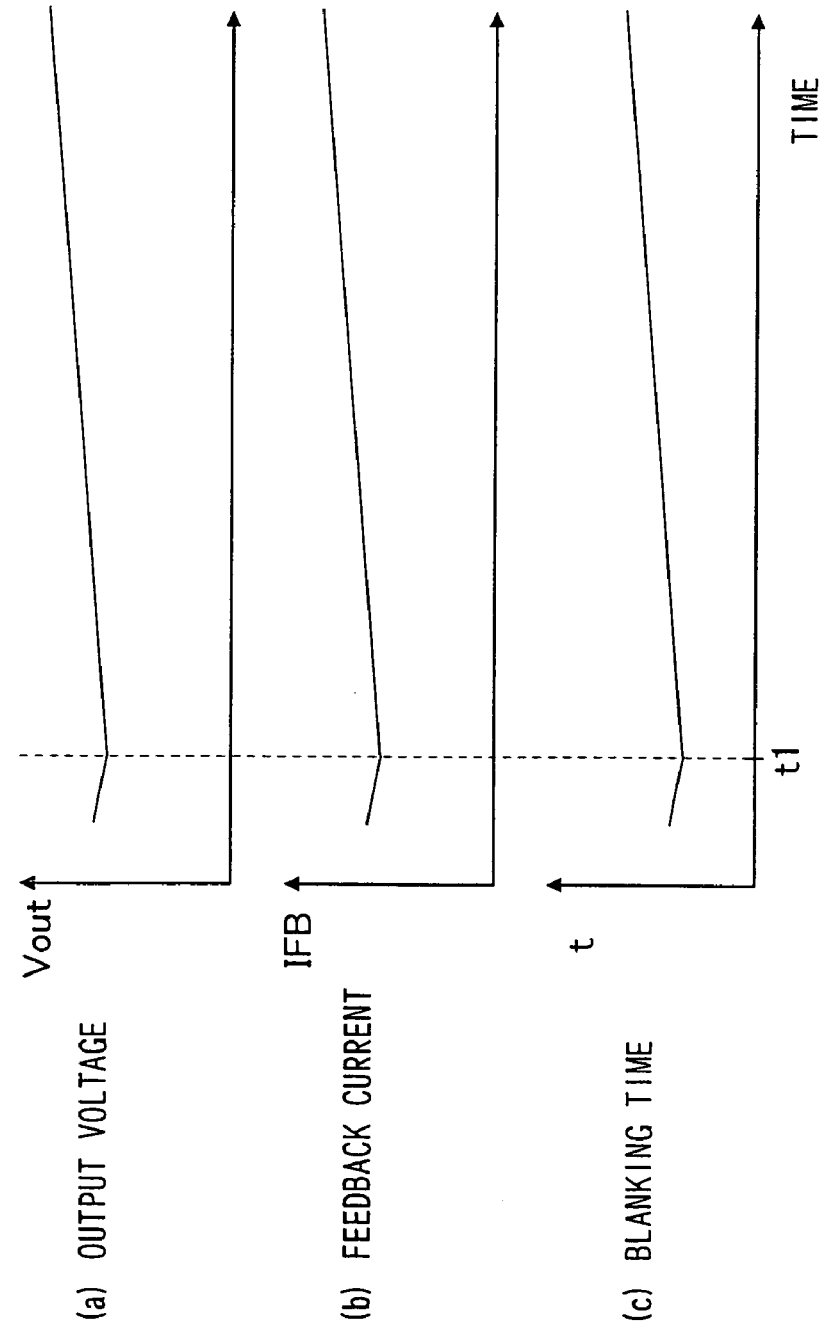
FIG. 14 is a waveform chart showing the operations of the delay circuit in the semiconductor device for controlling the switching power supply according to Embodiment 3.

FIG. 12 is a circuit diagram showing a structural example of the semiconductor device for controlling the switching power supply according to Embodiment 3. FIG. 13 is a circuit diagram showing a structural example of a delay circuit in the semiconductor device for controlling the switching power supply according to Embodiment 3. FIG. 14 is a waveform chart showing the operations of the delay circuit in the semiconductor device for controlling the switching power supply according to Embodiment 3.

Unlike the delay circuit 52 in the semiconductor device for controlling the switching power supply according to Embodiment 2 of FIG. 9, FIG. 12 shows a structural example for automatically changing delay time from an I-V converter 29 through a node 59 according to a load detected by a control terminal 50. A current is drawn by mirror circuits according to a current which is changed by a load and applied from the control terminal 50. The mirror circuits are constituted of P-type MOSFETs 23 and 24 and N-type MOSFETs 25 and 26, respectively. As a larger current is drawn with a lighter load, the delay time is increased by a delay circuit 52 through the node 59.

FIG. 13 shows a structural example of the delay circuit 52 for linearly changing the delay time according to a change of a load, unlike the delay circuit 52 of FIG. 12. The node 59 of FIG. 12 is connected to the gate of an N-type MOSFET 1101. In this configuration, among a constant current It of a constant current source 1100, a current I1 of the N-type MOSFET 1101, a current I2 of an N-type MOSFET 1102, and a discharge current Ic from a capacitance C, the following relationship is established:

$$It \text{ (constant)} = I1 + I2$$

$$I2 = It \text{ (constant)} - I1 = Ic$$

When the current I1 of the N-type MOSFET 1101 is subtracted from the constant current It, the current I2 of the N-type MOSFET 1102 is obtained. The current Ic obtained as a mirror serves as a discharge current from the capacitance C, and the discharge time of the discharge current determines the delay time of the delay circuit 52. In this case, when the current I1 increases according to an increase in a feedback current IFB from the control terminal 50, the current I2 decreases and the current Ic, which has the same value, also decreases. The time of discharge from the capacitance C increases and the delay time also increases.

Therefore, as shown in FIG. 14, when a load becomes lighter and an output voltage Vout increases at time t1, the feedback current IFB increases. When the current I1 increases according to an increase in the feedback current IFB, the current I2 decreases and the current Ic also decreases. The time of discharge from the capacitance C increases, the delay time increases, and blanking time t also increases.

As described above, it is possible to automatically change, according to a load, the start of the blanking time for delaying the power MOSFET 1 which is turned on in response to the transformer reset detection signal. The lighter load, the lower maximum frequency. Thus, it is possible to reduce a switching loss in the switching element (power MOSFET) 1. A switching loss can be effectively reduced particularly at light load.

The following will discuss a structural example of a counter circuit 14 used in the semiconductor devicees for controlling the switching power supplies according to the above-described embodiments.

Figure 15:
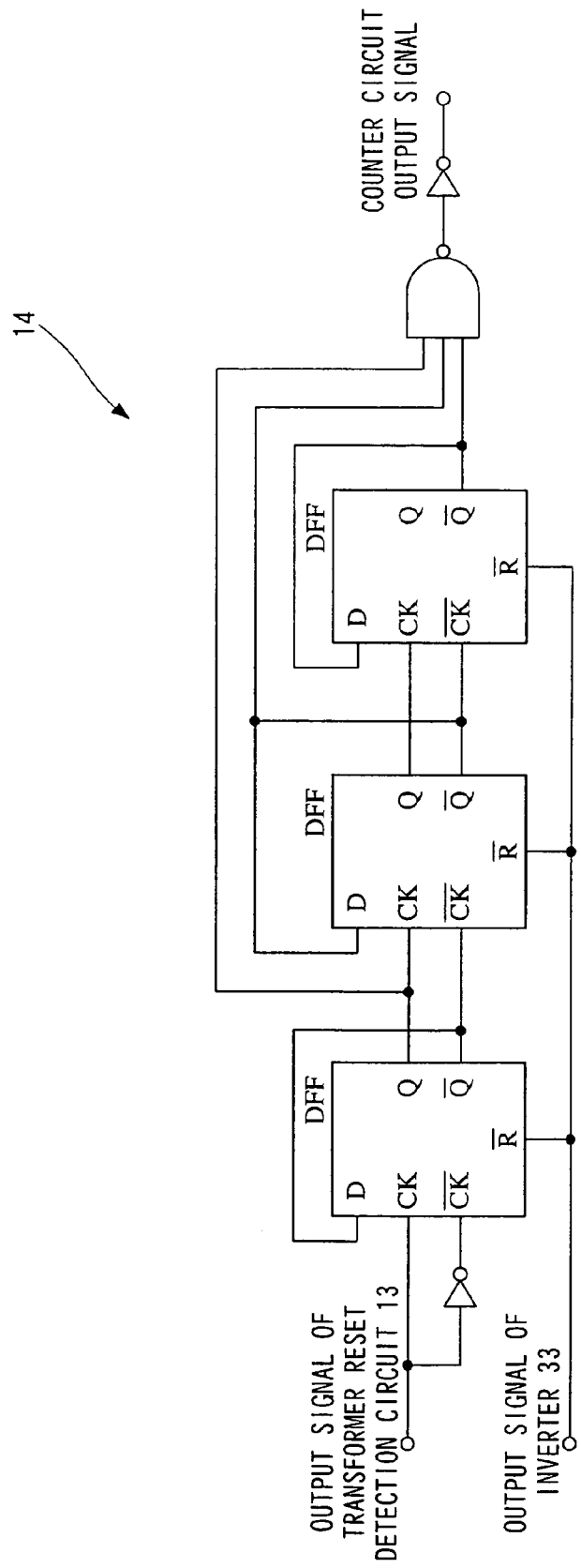
FIG. 15 is a circuit diagram showing a structural example of a counter circuit in the semiconductor device for controlling the switching power supply according to the embodiments of the present invention.
Figure 16:
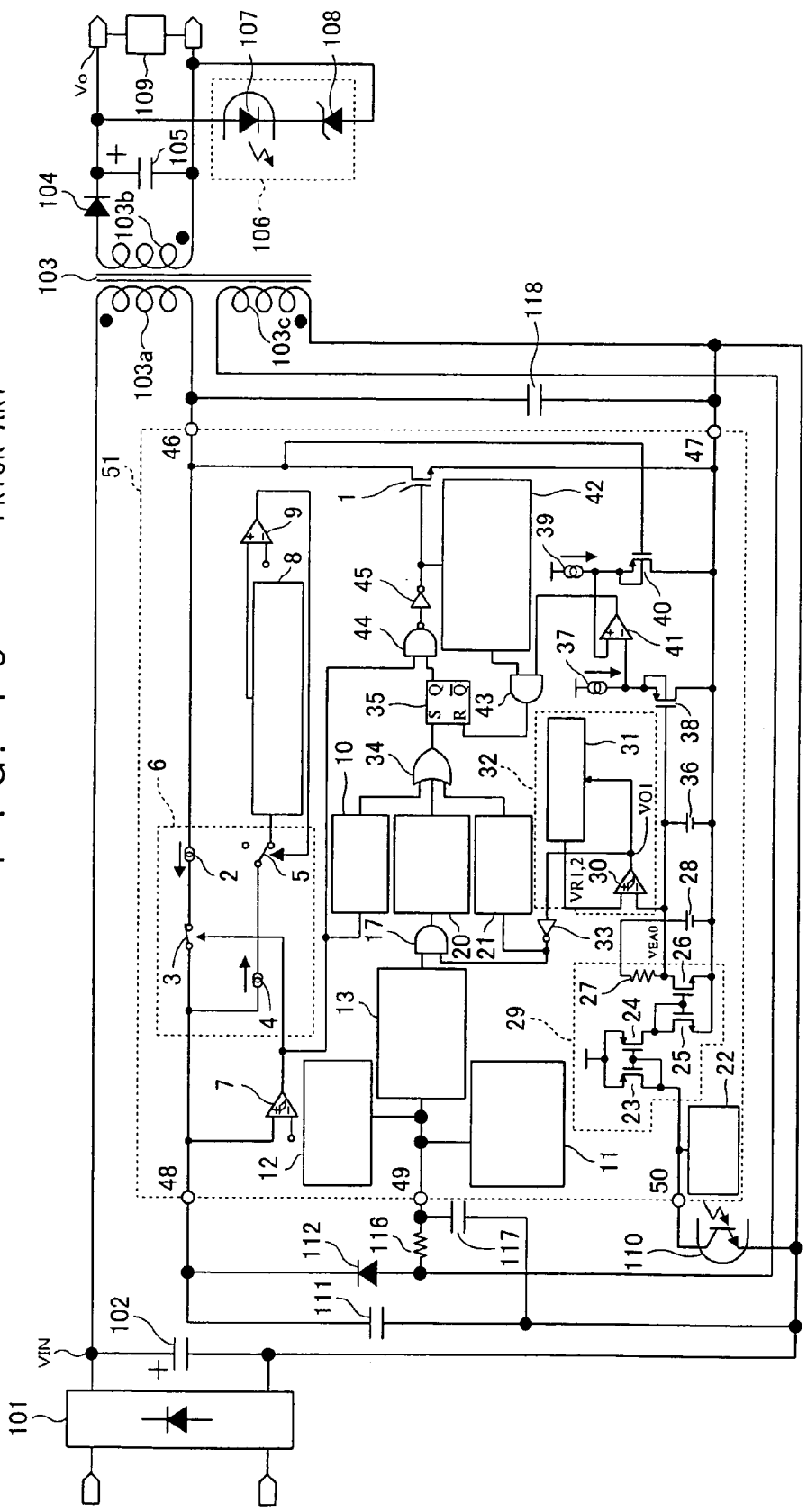
FIG. 16 is a circuit diagram showing a structural example of a conventional semiconductor device for controlling a switching power supply.

FIG. 15 is a circuit diagram showing a structural example of the counter circuit used in the semiconductor device for controlling the switching power supply according to the present embodiment. The counter circuit 14 in this structural example is, for example, a general-purpose pulse counter and thus the explanation of the configuration thereof is omitted.

The counter circuit 14 starts operating in response to a switching stop signal serving as the output signal of an inverter 33 during an intermittent operation. The output signal of the counter circuit 14 is at L level. In this circuit configuration, when the transformer reset detection signal from a transformer reset detection circuit 13 is counted sixth times, the output is at H level. That is, when a return signal is outputted in five counts to restart the switching operation, the switching element (power MOSFET) 1 is turned on by the subsequent transformer reset detection signal.

On the other hand, in the case of six or more counts in this circuit configuration, the H level is inputted to the set signal of the RS flip-flop 16 of FIG. 1 and the output Q is set at H level. In this case, the on signal of the gate of the switching element 1 is outputted in response to the return signal during the intermittent operation.

The reset signal is not inputted to the RS flip-flop 16 until the transformer reset detection signal is detected after return. Therefore, a D flip-flop (DFF) of FIG. 15 is made inoperative by the return signal and the output signal of the counter circuit 14 is held by the RS flip-flop 16.

As described above, by adding such steps as counting and delaying to an intermittent operation, the efficiency of a power supply is further improved. Emphasis is laid on the energy conservation of products and thus standby power consumption of 0.1 W can be achieved by W.W input which has prevailed in the current society.

Embodiments 1 to 3 described an MOSFET as a switching element. A bipolar transistor, an IGBT, or an element which is a combination of these transistors may be used.

What is claimed is:

1. A semiconductor device for controlling a switching power supply, in which a direct-current input voltage is applied to a switching element via a primary winding of a transformer, a direct-current voltage obtained by rectifying and smoothing an alternating current having been generated on a secondary winding of the transformer is controlled by a switching operation of the switching element, and power is supplied to a load, the semiconductor device comprising a control circuit, the control circuit comprising:

a transformer reset detection circuit for detecting a reset state of the transformer generated by the switching operation of the switching element from an alternating voltage generated on a tertiary winding of the transformer, and outputting a transformer reset detection signal indicating the reset state;

an I-V converter for converting into a voltage a value of a control current indicating a change in the direct-current voltage, the change being made according to the alternating current generated on the secondary winding of the transformer; and a light load detection circuit for outputting a control signal for controlling an intermittent operation of switching performed by the switching element when a light load is detected as a load indicating a magnitude of power supply to the load, the light load being detected according to a change in output voltage from the I-V converter, the light load detection circuit outputting the control signal for controlling the intermittent operation such that the switching operation of the switching element is stopped when the output voltage from the I-V converter is lower than a light load detection lower limit voltage for detecting the light load and such that the switching operation of the switching element is restarted when the output voltage from the I-V converter is higher than a light load detection upper limit voltage for detecting the light load, the control circuit driving a control electrode of the switching element and controlling the intermittent operation in response to the transformer reset detection signal from the transformer reset detection circuit and the control signal from the light load detection circuit, wherein the control circuit comprises a switching-on controller which starts counting, by means of a counter circuit, the transformer reset detection signal from the transformer reset detection circuit at a time when the switching operation is stopped in response to the control signal from the light load detection circuit, and controls timing of switching on at restart of the switching operation according to an order of the counting and the switching operation restarted in response to the control signal from the light load detection circuit, and the switching-on controller turns on switching at the restart of the switching operation at a time when the transformer reset detection signal is outputted from the transformer reset detection circuit after the control signal is outputted, when the control signal indicating the restart of the switching operation is outputted from the light load detection circuit before the counting of the counter circuit.

2. The semiconductor device for controlling the switching power supply according to claim 1, wherein the switching-on controller turns on switching at the restart of the switching operation at a time when the control signal is outputted, when the control signal indicating the restart of the switching operation is outputted from the light load detection circuit after the counting of the counter circuit.

3. The semiconductor device for controlling the switching power supply according to claim 1, wherein regarding timing of counting, the counter circuit determines, based on an input terminal voltage waveform of the switching element when the switching operation is stopped, a set count value as timing with an optimum number of counts for the number of waves of the waveform according to a used load.

4. The semiconductor device for controlling the switching power supply according to claim 2, wherein regarding timing of counting, the counter circuit determines, based on an input terminal voltage waveform of the switching element when the switching operation is stopped, a set count value as timing with an optimum number of counts for the number of waves of the waveform according to a used load.

5. The semiconductor device for controlling the switching power supply according to claim 1, wherein the counter circuit resets a count value at a time when the control signal is outputted from the light load detection circuit, the control signal indicating the restart of the switching operation.

6. The semiconductor device for controlling the switching power supply according to claim 2, wherein the counter circuit resets a count value at a time when the control signal is outputted from the light load detection circuit, the control signal indicating the restart of the switching operation.

7. The semiconductor device for controlling the switching power supply according to claim 3, wherein the counter circuit resets a count value at a time when the control signal is outputted from the light load detection circuit, the control signal indicating the restart of the switching operation.

8. The semiconductor device for controlling the switching power supply according to claim 4, wherein the counter circuit resets a count value at a time when the control signal is outputted from the light load detection circuit, the control signal indicating the restart of the switching operation.

9. The semiconductor device for controlling the switching power supply according to claim 1, wherein in the counter circuit, a plurality of D flip-flops are arranged in series, terminals of the D flip-flops are connected to obtain the set count value, the transformer reset detection signal from the transformer reset detection circuit is inputted to a clock terminal of the D flip-flop of a first stage, the control signal from the light load detection circuit is inputted to a reset terminal of the D flip-flop, and the timing of counting is outputted, via an AND circuit connected to an output of the D flip-flop, based on the transformer reset detection signal which is inputted from the transformer reset detection circuit to the D flip-flop of the first stage.

10. The semiconductor device for controlling the switching power supply according to claim 1, wherein the switching element and the control circuit are integrated on the same semiconductor substrate, the semiconductor device comprising at least, as external connection terminals on the semiconductor substrate, a switching element input terminal for inputting the input voltage to the switching element via the primary winding of the transformer, a switching element output terminal for outputting a switching current obtained by the switching operation of the switching element, a power supply terminal for supplying a direct-current voltage to the control circuit according to a current generated on the tertiary winding of the transformer in response to the switching operation of the switching element, a control terminal for inputting the control signal for controlling the intermittent operation of switching performed by the switching element, and a transformer reset detecting terminal for supplying the transformer reset detection signal to the transformer reset detection circuit.

11. The semiconductor device for controlling the switching power supply according to claim 9, wherein the switching element and the control circuit are integrated on the same semiconductor substrate, the semiconductor device comprising at least, as external connection terminals on the semiconductor substrate, a switching element input terminal for inputting the input voltage to the switching element via the primary winding of the transformer, a switching element output terminal for outputting a switching current obtained by the switching operation of the switching element, a power supply terminal for supplying a direct-current voltage to the control circuit according to a current generated on the tertiary winding of the transformer in response to the switching operation of the switching element, a control terminal for inputting the control signal for controlling the intermittent operation of switching performed by the switching element, and a transformer reset detecting terminal for supplying the transformer reset detection signal to the transformer reset detection circuit.

* * * * *